(12) United States Patent
Swanson

(10) Patent No.: US 11,646,560 B2
(45) Date of Patent: May 9, 2023

(54) HOLDER FOR STRAPS HAVING HOOKS AND METHODS OF MAKING AND USING

(71) Applicant: OPTIMUM SOLUTIONS, LLC, Eagan, MN (US)

(72) Inventor: James F. C. Swanson, Eagan, MN (US)

( * ) Notice: Subject to any disclaimer, the term of this patent is extended or adjusted under 35 U.S.C. 154(b) by 792 days.

(21) Appl. No.: 16/590,749

(22) Filed: Oct. 2, 2019

(65) Prior Publication Data

US 2021/0101775 A1    Apr. 8, 2021

(51) Int. Cl.
| B65H 75/06 | (2006.01) |
| H02G 11/00 | (2006.01) |
| B65H 75/44 | (2006.01) |
| B65H 75/40 | (2006.01) |
| B65H 75/28 | (2006.01) |

(52) U.S. Cl.
CPC .............. *H02G 11/00* (2013.01); *B65H 75/06* (2013.01); *B65H 75/285* (2013.01); *B65H 75/40* (2013.01); *B65H 75/4476* (2013.01); *B65H 2402/41* (2013.01); *B65H 2701/35* (2013.01); *Y10T 24/39* (2015.01)

(58) Field of Classification Search
CPC ...... B65H 75/06; B65H 75/40; B65H 75/285; B65H 75/4473; B65H 75/4476
See application file for complete search history.

(56) References Cited

U.S. PATENT DOCUMENTS

| 4,586,675 A | 5/1986 | Brown |
| 5,526,931 A | 6/1996 | White |
| 6,142,405 A * | 11/2000 | Black ............... H02G 11/02 |
| | | 242/402 |
| 6,302,347 B1 | 10/2001 | Amirault |
| 6,962,306 B2 | 11/2005 | West |
| D640,530 S | 6/2011 | Perez |

(Continued)

FOREIGN PATENT DOCUMENTS

DE    20016486 U1    3/2001

OTHER PUBLICATIONS

Strap Wrap Organizer—4-Pack—Ratchet Cargo Tie-Down Strap Storage—Manages Strap During Use Too! (4, for 2" Wide Straps), retrieved from https://www.amazon.com/Strap-Wrap-Organizer-Ratchet-Tie-Down/dp/B07DNFH5WJ on Oct. 1, 2019, 3 pages.

*Primary Examiner* — Sang K Kim
(74) *Attorney, Agent, or Firm* — Berggren Law Offices

(57) ABSTRACT

A holder for straps includes a base including a body portion and a tail portion, and a waist where the body portion and the tail portion join. The base defines first and second horizontally opposed recesses and a wrap area disposed therebetween. First embodiments of the holder include pegs disposed on opposing sides of the wrap area. The pegs can engage with S-hooks, D rings, snap hooks, carabiners and the like. Second embodiments of the holder include a base defining slots from edges of the body portion and disposed on opposing sides of the wrap area. The slots can engage with J-hooks, T-hooks, U-hooks, and the like. After securing the hook thereof, each strap is wrapped around the base through first and second recesses. Straps can be secured by disposing a loop such as a loop of bungee cord or a tie about the waist and tightening the cord or tie.

10 Claims, 10 Drawing Sheets

(56) References Cited

U.S. PATENT DOCUMENTS

| | | | |
|---|---|---|---|
| 2001/0022331 A1* | 9/2001 | Smith | B65H 75/06 |
| | | | 242/405.2 |
| 2004/0060842 A1 | 4/2004 | Gholston | |
| 2004/0074137 A1 | 4/2004 | Levy | |
| 2007/0039912 A1 | 2/2007 | Hinkens | |
| 2010/0308182 A1 | 12/2010 | Lahti | |
| 2012/0118342 A1 | 5/2012 | Perez | |

* cited by examiner

HOLDER FOR STRAPS HAVING HOOKS AND METHODS OF MAKING AND USING

The present invention relates generally to a holder for holding, storing, and/or transporting straps. The present invention also relates to methods of making and using the holder.

BACKGROUND

Many different types of cords, ropes, strings, twine, cables, hoses, electrical wire, straps, and other flexible elongated objects are commonly used in both home and commercial settings, for example electrical extension cords, string, twine, hoses, electrical wire, bungee cords, and straps.

Straps are widely used for securing items for transport, recreation, and outdoor activities. Straps may be used to attach and bind items together. Examples of straps include ratchet straps, buckle straps, tie-down (lashing) straps, winch straps, and the like.

Many straps comprise a web with a terminating hook or pair of hooks. The web is in the form of a flat strip or flat tube. The web may comprise nonwoven material or a woven material (webbing). Examples of non-woven materials include leather, metals such as steel, and plastics, as well as fiber-reinforced composite materials such as plastic reinforced with filaments such as tensilized polypropylene, polyester yarn, or glass fiber.

Webbing is a strong fabric woven as a flat strip or flat tube. The webbing may be woven from natural fibers such as hemp, cotton, or linen; or synthetic fibers such as polyamides, polyolefins, rayon, or polyesters.

Despite the benefits they provide, flexible elongated objects can be difficult to store due to their length and because they easily become tangled. Accordingly, flexible elongated objects are often wound or wrapped into a more compact shape, like a circular or flat loop shape, before storing them. Many people simply wind the flexible elongated objects around their arms or hands. However, such an approach may become unwieldy for flexible elongated objects that are particularly heavy, long, thick, etc. and such an approach is inapposite for storage.

Moreover, once the flexible elongated objects have been wound into a more convenient shape, they may easily become unwound from that shape. In particular straps may easily become unwound, because their webs have a relatively flat cross-section, thereby enabling coils or windings to slip over one another. Especially problematic are straps whose webs are made of a slippery synthetic material such as synthetic fiber webbing.

In view of the above, it would be advantageous to provide storage holders for storing flexible elongated objects. It would be particularly advantageous if storage holders were effective for storing, transporting, and securely holding straps.

SUMMARY OF THE INVENTION

Holders for holding straps are disclosed. Also disclosed are methods of making and using the holders.

Summary of First Embodiments of the Holder

In a first embodiment, a holder comprises a base. The base comprises top and bottom major surfaces defining a thickness, t, therebetween. The top and bottom surfaces are opposing. In embodiments, the top surface and the bottom surface are coplanar or substantially coplanar. The base defines at least one length on a longitudinal axis, at least one width on a transverse axis, and at least one thickness, t, on a vertical axis and between the top surface and the bottom surface.

The base comprises, consists of, or consists essentially of a body portion and a tail portion. In embodiments, the base is a single piece, i.e. the body portion and the tail portion are not separate pieces joined but each is a portion of the base that is a single piece. In embodiments, the body portion is planar or substantially planar, that is defines a single invariant or substantially invariant thickness t.

The body portion defines a first edge and a second edge. The first and second edges are opposing. In embodiments, at least a portion of the first edge is linear or substantially linear and at least a portion of the second edge is linear or substantially linear. In embodiments, the first edge is linear or substantially linear and/or the second edge is linear or substantially linear. In embodiments, the first edge and the second edge are parallel or substantially parallel to each other.

The body portion defines an upper end and a lower end. The upper and lower ends are opposing. In embodiments, at least a portion of the upper end is linear or substantially linear and/or at least a portion of the lower end is linear or substantially linear. In embodiments, the upper end and the lower end are parallel or substantially parallel to each other.

In embodiments, the first edge and the second edge are horizontally opposed in a transverse direction. In embodiments, the upper end and the lower end are horizontally opposed to each other in a longitudinal direction. In embodiments, the top surface and the bottom surface are horizontally opposed to each other in a vertical direction. Stated differently, in embodiments first and second edge are parallel to each other or substantially parallel to each other, and each of first and second edges is perpendicular to or substantially perpendicular to the upper end and the lower end. In these embodiments, the ends (upper and lower ends), the edges (first and second edges), and the surfaces (top and bottom surfaces) are mutually perpendicular or substantially mutually perpendicular. In such embodiments, the first and second edges run in a longitudinal direction or substantially in the longitudinal direction, upper and lower ends run in a transverse direction or substantially in a transverse direction, and upper and lower surfaces are separated by a thickness t in a vertical direction, wherein the longitudinal direction, transverse direction, and vertical direction are mutually perpendicular.

The body portion defines at least one length (on a longitudinal axis) from the upper end to the lower end, at least one width (on a transverse axis) from the first edge to the second edge, and at least one thickness (on a vertical axis) from the top surface to the bottom surface.

The tail portion of the base is attached to the lower end of the body portion. The tail portion and the body portion can form a single piece, or the tail portion and body portion can be separate pieces attached by attachment means. The tail portion extends from the lower end of the body portion and extends to a distal end of the base, wherein the distal end of the base is distal to the body portion.

The base defines a first recess in the upper end of the body portion and a second recess in the distal end of the base. The top surface includes a first wrap area extending longitudinally between the first recess and the second recess. The bottom surface includes a second wrap area extending longitudinally between the first recess and the second recess.

In embodiments, the first recess includes a linear edge, the first wrap edge. The first wrap edge is located where first and second wrap areas abut the first recess.

In embodiments, the second recess includes a linear edge, the second wrap edge. The second wrap edge is located where the first and second wrap areas abut the second recess.

In embodiments, the first wrap edge and the second wrap edges are parallel or substantially parallel to each other. In embodiments, the first wrap edge and the second wrap edge are parallel to or substantially parallel to upper end and lower end of the body portion of the base.

In embodiments, the first wrap edge is linear or substantially linear and defines a first end and a second end and midpoint $M_1$ equidistant between the first end and the second end.

In embodiments, the second wrap edge is linear or substantially linear and defines a first end and a second end and midpoint $M_2$ equidistant between the first end and the second end. In such embodiments, the second wrap edge defines a quarterpoint $Q_1$ that is the midpoint between the first end and $M_2$ and a quarterpoint $Q_2$ that is the midpoint between the second end and $M_2$.

In embodiments, the second wrap edge is parallel or substantially parallel to the waist.

The base defines a waist therein, where the body portion and the tail portion share a boundary (i.e. where they abut). Stated differently, the tail portion is attached to the lower end of the body portion, and the attachment defines a waist. The waist is a locally minimum width in the base in the transverse direction. In embodiments, the waist is a line that is parallel or substantially parallel to the upper end and/or the lower end. In embodiments, the waist is the narrowest width of the base in a transverse direction within a distance of a quarter of an inch, in embodiments half an inch, or in embodiments one inch from the waist.

In embodiments, the waist is perpendicular to a line between $M_1$ and $M_2$.

In embodiments, the first recess has an acute trapezoid shape. In some such embodiments, the first recess has an isosceles trapezoid shape. The trapezoid shape has shorter and longer parallel sides. In embodiments, the longer parallel side is coincident with the upper end of the body portion. In embodiments, the body portion includes a first wrap edge coincident with the shorter parallel side of the recess. However other shapes are possible. For example, in some embodiments the body defines a first recess having a semicircular, rectangular, or square shape.

In embodiments, the second recess has an acute trapezoid shape. In some such embodiments, the second recess has an isosceles trapezoidal shape. The trapezoid shape has a shorter and longer parallel sides. In embodiments, the longer parallel side is coincident with the distal end of the base. However other shapes are possible. For example, in some embodiments the tail portion of the body defines a second recess having a semicircular, rectangular, or square shape.

The holder further comprises first and second arrays of pegs. In embodiments, the first and second arrays are disposed on opposing sides of the first wrap area, wherein the first array is disposed between the first edge of the body portion and the second array is disposed between the first wrap area and the second edge of the body portion. Stated differently, in embodiments the position of every peg is offset with respect to the winding track.

In some embodiments, each of the pegs in a single array is offset from the winding track by the same amount as the other pegs, that is the array is parallel to the winding track and the first and second wrap areas, i.e. the array runs in a longitudinal direction. However, in other embodiments, each of the pegs in an array (first array of pegs, second array of pegs, or both first and second arrays of pegs) is offset from the winding track by different amounts. For example, in embodiments each array is disposed in a pattern diagonal with respect to the first and second wrap areas and/or the first and second edges.

In a further example, each array is disposed in an arc about any point on the second wrap edge. In all such embodiments (parallel, diagonal, or arc), each array is offset from the wrap areas and winding track, i.e. is disposed between one of the first and second edges of the body portion and one of the first and second wrap areas.

In embodiments, each of first and second arrays extends in a straight line between the upper and lower ends of the body portion. In embodiments, the first array is proximal the first edge of the body portion and the second array is proximal the second edge of the body portion.

In embodiments, the first array is parallel or substantially parallel to the first edge and/or the second array is parallel to or substantially parallel to the second edge.

In embodiments, the first array, the second array, the first edge, and the second edge are parallel (to each other). In embodiments, each peg extends perpendicularly from the top surface. However, in other embodiments, one or more or all pegs do not extend perpendicularly from the top surface. For example, in embodiments each peg extends from the top surface but tilts toward the upper end of the body portion, toward the first edge of the body portion, toward the second edge of the body portion, toward the lower end of the body portion, or combinations of upper or lower and first and second edges.

In some embodiments, the first and second array are attached to the body portion and are a single piece with the body portion. In other embodiments, the pegs can be attached to the base by an attachment means.

In embodiments, each peg comprises a post. In embodiments, each peg comprises a post and a cap. Each post extends in the vertical direction from the top surface of the body portion of the base. In some embodiments, the base and first and second arrays of pegs are a single piece, for exampled molded as a single piece of molded plastic. In other embodiments, the pegs are attached to the base. In some such embodiments, the post of each peg passes through a hole in the base and is affixed thereto.

The holder of the first embodiments is particularly well suited to hold S-hook terminated straps, straps terminating in snap hooks, straps terminated with D-rings, and the like.

Summary of Second Embodiments of the Holder

In a second embodiment, the holder comprises a base. The base defines a major top and bottom surfaces defining a thickness, t, therebetween. In embodiments, the top surface and the bottom surface are coplanar or substantially coplanar. The base defines at least one length on a longitudinal axis, at least one width on a transverse axis, and at least one thickness t on a vertical axis and between the top surface and the bottom surface. In embodiments, the body portion is planar or substantially planar, that is defines a single invariant or substantially invariant thickness t.

The base comprises, consists of, or consists essentially of a body portion and a tail portion. In embodiments, the base is a single piece, i.e. the body portion and the tail portion are not separate pieces joined but each is a portion of the base that is a single piece.

The body portion defines a first edge and a second edge. In embodiments, the first edge and the second edge are parallel or substantially parallel to each other. The body portion defines an upper end and a lower end. In embodiments, the upper end and the lower end are parallel or substantially parallel to each other.

The body portion defines at least one length (on a longitudinal axis) from the upper end to the lower end, at least one width (on a transverse axis) from the first edge to the second edge, and at least one thickness (on a vertical axis) from the top surface to the bottom surface.

In embodiments, the first edge and the second edge are horizontally opposed in a transverse direction. In embodiments, the upper end and the lower end are horizontally opposed to each other in a longitudinal direction. In embodiments, the top surface and the bottom surface are horizontally opposed to each other in a vertical direction. Stated differently, in embodiments first and second edge are parallel to each other or substantially parallel to each other, and each of first and second edges is perpendicular to or substantially perpendicular to the upper end and the lower end. In these embodiments, the ends (upper and lower ends), the edges (first and second edges), and the surfaces (top and bottom surfaces) are mutually perpendicular or substantially mutually perpendicular. In such embodiments, the first and second edges run in a longitudinal direction or substantially in the longitudinal direction, upper and lower ends run in a transverse direction or substantially in a transverse direction, and upper and lower surfaces are separated by a thickness t in a vertical direction, wherein the longitudinal direction, transverse direction, and vertical direction are mutually perpendicular.

The tail portion of the base extends from the lower end of the body portion and extends to a distal end of the base, wherein the distal end of the base is distal to the body portion.

The base defines a first recess in the upper end of the body portion and a second recess in the distal end of the base. The base includes a first wrap area on the top surface extending longitudinally between the first recess and the second recess, and a second wrap area on the bottom surface extending longitudinally between the first recess and the second recess.

The base defines a waist therein, where the body portion and the tail portion share a boundary (i.e. where they abut). Stated differently, the tail portion is attached to the lower end of the body portion, and the attachment defines a waist.

The waist is a locally minimum width in the base in the transverse direction. In embodiments, the waist is a line that is parallel or substantially parallel to the upper end and/or the lower end. In embodiments, the waist is the narrowest width of the base in a transverse direction within a distance of a quarter of an inch, in embodiments half an inch, or in embodiments one inch from the waist.

In embodiments, the first recess has an acute trapezoid shape. In some such embodiments, the first recess has an isosceles trapezoid shape. The trapezoid shape has shorter and longer parallel sides. In embodiments, the longer parallel side is coincident with the upper end of the body portion. However other shapes are possible. For example, in some embodiments the body defines a first recess having a semicircular, rectangular, or square shape.

In embodiments, the second recess has an acute trapezoid shape. In some such embodiments, the second recess has an isosceles trapezoidal shape. The trapezoid shape has a shorter and longer parallel sides. In embodiments, the longer parallel side is coincident with the distal end of the base.

The body portion of the base defines a first array of slots extending from the first edge towards the second edge. Each slot of the first array is open at the first edge. In embodiments, each slot of the first array is located between the first edge and the first and second wrap areas, i.e. no portion of the slots is located within the first and second wrap areas.

The body portion of the base defines a second array of slots extending from the second edge towards the first edge. Each slot of the second array is open at the second edge. In embodiments, each slot of the first array is located between the second edge and the first and second wrap areas, i.e. no portion of the slots is located within the first and second wrap areas. Stated differently, each slot is offset with respect to the winding track.

In embodiments, the first recess includes a linear edge, the first wrap edge. The first wrap edge is located where first and second wrap areas abut the first recess.

In embodiments, the second recess includes a linear edge, the second wrap edge. The second wrap edge is located where the first and second wrap areas abut the second recess.

In embodiments, the first wrap edge and the second wrap edges are parallel or substantially parallel to each other. In embodiments, the first wrap edge and the second wrap edge are parallel to or substantially parallel to upper end and lower end of the body portion of the base.

In embodiments, the first wrap edge is linear or substantially linear and defines a first end and a second end and midpoint $M_1$ equidistant between the first end and the second end.

In embodiments, the second wrap edge is linear or substantially linear and defines a first end and a second end and midpoint $M_2$ equidistant between the first end and the second end. In such embodiments, the second wrap edge defines a quarterpoint $Q_1$ that is the midpoint between the first end and $M_2$ and a quarterpoint $Q_2$ that is the midpoint between the second end and $M_2$.

In embodiments, the second wrap edge is parallel or substantially parallel to the waist.

In embodiments, the waist is perpendicular to a line between $M_1$ and $M_2$.

Each slot has an upper edge and a lower edge. In embodiments, at least a portion of the upper edge is linear. In embodiments, the upper edge is linear.

Each slot has a lower edge, wherein the lower edge is more proximal to the lower edge of the body portion than the upper edge. Stated differently, the average distance between the upper edge of a slot and the lower end of the body portion is greater than the average distance of the lower edge of the slot to the lower end of the body portion.

In embodiments, the lower edge of each slot includes a recess therein, a seating notch, defined by the body portion of the base. The seating notch has a lower edge with midpoint $M_3$. In embodiments, the lower edge of the seating notch is linear or substantially linear.

In embodiments, for each slot that includes a seating notch, a straight line from $M_3$ to the nearer of $Q_1$ and $Q_2$ is the shortest distance between the slot and the nearer of $Q_1$ and $Q_2$.

In embodiments, for each slot that includes a seating notch, a straight line from $M_3$ to the nearer of $Q_1$ and $Q_2$ intersects the lower edge of the seating notch at 90°.

In embodiments, the lower edge of each slot intersects the first or second edges of the body portion at 90°.

In embodiments, the waist is perpendicular or substantially perpendicular to a straight line between $M_1$ to $M_2$.

In embodiments, the holder is symmetrical about a straight line between $M_1$ and $M_2$.

The holder of the second embodiments is particularly well suited to hold J-hook terminated straps, and straps terminating in hooks also known as T-hooks, and U-hooks.

DETAILED DESCRIPTION

Figure 1:
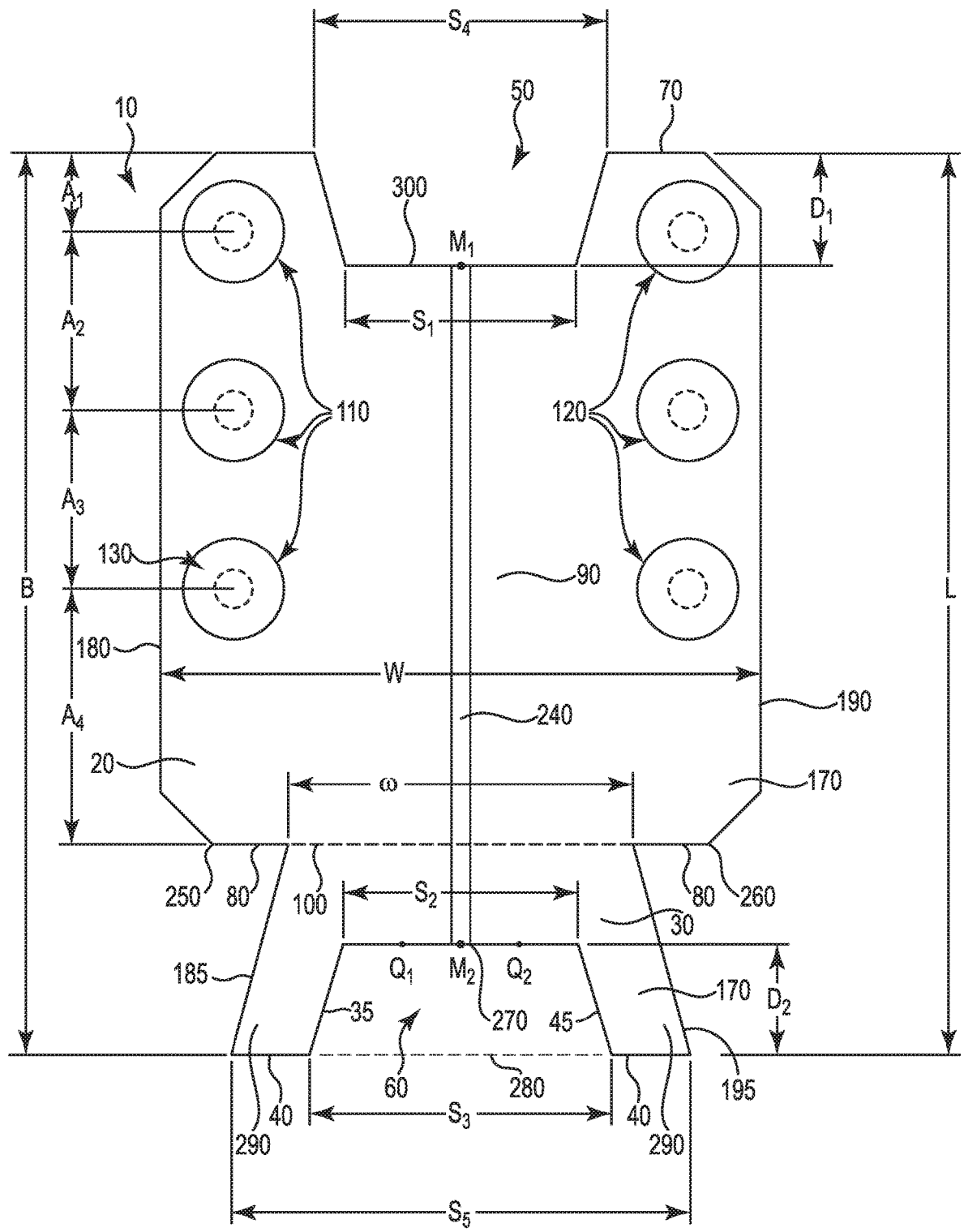
FIG. 1 is a schematic view in a first aspect of a first embodiment of a holder.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the term "webbing" refers to a strip of flexible woven or non-woven material in the form of a flat strip or flat tube, the strip or tube having an aspect ratio of length to width of 10 to 10,000.

As used herein, the term "strap" refers to webbing including a hook attached to one end of the webbing length; or including two hooks attached at distal ends of the webbing length.

As used herein, unless otherwise specified or dictated by context, the term "hook" includes J-hook, T-hook, U-hook, S-hook, D-ring, snap hook, or carabiner; and the term "hooks" includes one or more J-hooks, one or more T-hooks, one or more U-hooks, one or more S-hooks, one or more D-rings, one or more snap hooks, one or more carabiners, or any combination thereof.

As used herein, the terms "longitudinal axis", "transverse axis", and "vertical axis" refer to three mutually perpendicular axes; and the terms "longitudinal direction", "transverse direction", and "vertical direction" refer to directions along a longitudinal axis, transverse axis, and vertical axis respectively.

As used herein, the term "waist" refers to a minimum circumference of the base (as described herein), wherein the circumference of the base adjacent to the waist is greater than the circumference of the base at the waist.

As used herein, the term "bungee loop" refers to a length of bungee cord that is curved or doubled over and attached to itself, thereby defining an opening.

As used herein, the term "bungee cord" refers to an elasticized cord. In this context, "elasticized" means capable of resuming its original dimensions after stretching.

As used herein, the term "winding track" refers to a path for winding a long flexible object such as the webbing of a strap around the holder as described herein. The winding track includes the second wrap edge, the second wrap area, the first wrap edge and the first wrap area as described herein.

The term "isosceles trapezoid" refers to a convex quadrilateral with a line of symmetry bisecting one pair of opposing sides. It is a shape that has two parallel or substantially parallel sides and two non-parallel sides of equal length.

As used herein, "distal end of the base" refers to the end of the base distal to the upper end of the body portion of the base as further described herein.

The terms "comprise(s)," "include(s)," "having," "has," "can," "contain(s)," and variants thereof, as used herein, are intended to be open-ended transitional phrases, terms, or words that do not necessarily but may preclude the possibility of additional acts or structures. The singular forms "a," "and," and "the" include plural references unless the context clearly dictates otherwise. The present disclosure also contemplates other embodiments "comprising," "consisting of," and "consisting essentially of," the embodiments or elements presented herein, whether explicitly set forth or not. Generally and as determined by context, the term "includes," as used in the specification, may be interpreted to mean any of "comprising," "consisting of," or "consisting essentially of."

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, length, shape, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

General Discussion

A holder for holding straps terminated with hooks is disclosed. In any of the disclosed embodiments, the holder may further comprise a loop encircling the waist. The holder may be used for holding straps terminated with hooks.

The holder includes a receptacle for the hooks. In first embodiments, as further described herein, each receptacle comprises, consists of, or consists essentially of a peg. First embodiments of the holder are particularly well suited for holding S-hook terminated straps. In second embodiments, as further described herein, the receptacle comprises, consists of, or consists essentially of a slot defined by the base. Second embodiments of the holder are particularly well suited for holding J-hook, T-hook, and U-hook terminated straps and the like.

PARTS LIST

10. Holder
20. Body portion
30. Tail portion
35. First inner edge of tail portion
40. Distal end of the base
45. Second inner edge of tail portion
50. First recess
60. Second recess
70. Upper end of body portion
80. Lower end of body portion
90. First wrap area
95. Second wrap area
100. Waist
110. First array of pegs
120. Second array of pegs
130. Peg
140. Strap
150. S-hook
160. Bungee loop
170. Base
180. First edge of body portion
185. First outer edge of tail portion
190. Second edge of body portion
195. Second outer edge of tail portion
200. Post
210. Cap
220. Top surface of base
230. Bottom surface of base
240. Optional divider
250. First terminus
260. Second terminus
270. Second wrap edge
280. Longer parallel side
290. Leg
300. First wrap edge
310. Holder
320. Body portion
330. Tail portion
335. First inner edge of tail portion
340. Distal end of the base
345. Second inner edge of tail portion
350. First recess
360. Second recess
370. Upper end of body portion
380. Lower end of body portion
390. First wrap area
395. Second wrap area
400. Waist
410. Lobe
420. Slot
430. Strap
440. J-hook
450. Bungee loop
460. Base
470. First edge of body portion
475. First outer edge of tail portion
480. Second edge of body portion
485. Second outer edge of tail portion
490. Edge widening of slot
500. Leg
510. Seating notch
520. Top surface of base
530. Bottom surface of base
540. Shoulder opening
550. Lower edge of slot
560. First terminus
570. Second terminus
580. Second wrap edge
590. Longer parallel side
600. First wrap edge
610. Lower edge of seating notch
620. First array of slots
630. Second array of slots
640. Upper edge of slot
650. Intersection
660. First end of second wrap edge
670. Second end of second wrap edge
680. Opening of slot
690. Optional divider
700. Bend
710. Ring
720. Gap
730. Eyelet
740. Claw
750. Weld
760. Tip of S-hook
800. Bend
810. Ring
820. Gap
830. Eyelet
840. Tip of J-hook
850. Claw

DETAILED DISCUSSION

The invention will now be described in detail with reference to the drawings, including preferred embodiments.

First Embodiments

The First Embodiments will now be described in detail with reference to the drawings.

Although first embodiments are described in detail herein with respect to S-hooks, the use of the holder of the second embodiments is not limited to S-hook terminated straps.

FIG. 1 is a view of a holder of the first embodiments. The holder 10 comprises base 170. Base 170 includes a body portion 20 and a tail portion 30. Body portion 20 defines a upper end 70 and a lower end 80, wherein the lower end is horizontally opposed to the upper end. The lower end extends between a first terminus 250 and a second terminus 260. Body portion 20 defines first edge 180 and second edge 190, wherein the second edge is horizontally opposed to the first edge in a transverse direction. In embodiments, body portion 20 defines a rectangular shape or substantially rectangular shape. Examples of substantially rectangular shapes include the shape shown in FIG. 1, wherein body portion 20 defines the shape of a rectangle with triangular corners removed. Another substantially rectangular shape is a shape obtained by rounding the corners of a rectangle. Other shapes are possible, for example a body portion may define a stadium shape elliptical shape, oval shape, polygonal shape, square shape, or a circular shape.

Tail portion 30 projects or extends from lower end 80 of body portion 20 to distal end 40 of the base, wherein distal end 40 is distal to the body portion. Where tail portion 30 abuts body portion 20, the tail portion is narrower than the body portion in the transverse direction whereby waist 100 is defined where body portion 20 and tail portion 30 abut. Waist 100 is a local minimum in the width of base 170 in the transverse direction. In embodiments shown in FIG. 1, tail portion 30 is not proximal first terminus 250 and is not proximal second terminus 260, and accordingly the base narrows laterally from both sides towards the waist, as shown in FIG. 1.

Moving away from waist 100 in a longitudinal direction toward either of upper end 70 or distal end 40, the width of base 170 increases in a transverse direction, for example as shown in FIG. 1.

Tail portion defines first edge 185 and second edge 195.

Waist 100 is a narrow point in transverse direction in base 170.

In the embodiments shown in the drawings, each of first outer edge 185 of tail portion and second outer edge 195 of tail portion is linear or substantially linear, and first and second outer edges diverge from one another. In the embodiment shown in FIG. 1, the acute angle between first outer edge 185 and lower end 80 of the body portion is 75°, i.e. first outer edge 185 is 15 to the longitudinal direction and the acute angle between second outer edge 195 and lower end 80 is 75° (i.e. 15° to the longitudinal direction). However, in other embodiments, the angle can vary, with the proviso that the first and second outer edges diverge from each other moving towards distal end 40 (i.e. distance between first and second outer edges is greater proximal to the distal end than proximal to the lower end of the body portion).

In embodiments, the acute angle between the first outer edge and the lower end of the body portion is about 80° to about 89°, in embodiments about 89° to about 25°, in embodiments about 80° to about 30°, in embodiments about 80° to about 40°, in embodiments about 80° to about 50°, in embodiments about 80° to about 60°, in embodiments about 75°, in embodiments about 60° to about 70°, in embodiments about 50 to about 60°, in embodiments about 40° to about 50°, in embodiments about 30° to about 40°.

In embodiments, the acute angle between the second outer edge and the lower end of the body portion is about 80° to about 89°, in embodiments about 89° to about 25°, in embodiments about 80° to about 30°, in embodiments about 80° to about 40°, in embodiments about 80° to about 50°, in embodiments about 80° to about 60°, in embodiments about 75°, in embodiments about 60° to about 70°, in embodiments about 50 to about 60°, in embodiments about 40° to about 50°, in embodiments about 30° to about 40°.

Any of the sharp angles shown in the figures can be radiused. For example, the angle where the lower end 80 of the body portion meets outer edge 185 and/or outer edge 195 may be sharp or radiused (rounded).

In some preferred embodiments, base 170 is a single piece, i.e. body portion 20 and tail portion 30 are portions of a single piece, base 170. Accordingly, in such embodiments base 170 can be molded as a single piece.

Base 170 defines a first recess 50 in upper end 70 of body portion 20 and second recess 60 in distal end 40. First recess 50 and second recess 60 are horizontally opposed in a longitudinal direction.

Base 170 includes first wrap area 90 and a second wrap area 95. First wrap area 90 is an area of top surface 220 of base 170, wherein wrap area 90 is located between first recess 50 and second recess 60. First wrap area 90 extends in a longitudinal direction from first recess 50 to second recess 60.

Base 170 also includes a second wrap area 95 (not shown in FIG. 1). The second wrap area is an area of bottom surface 230 of base 170, wherein the second wrap area is located between first recess 50 and second recess 60. Second wrap area 95 extends in a longitudinal direction from first recess 50 to second recess 60.

First wrap area 90 and second wrap area 95 have the same area or substantially the same area as each other.

In embodiments, first wrap edge 300, second wrap edge 270, first wrap area 90 and second wrap area 95 have the same width as each other in a transverse direction.

In embodiments, the first recess 50 has an acute trapezoid shape. In some such embodiments, the first recess 50 has an isosceles trapezoid shape, as shown in FIG. 1. The trapezoid shape has shorter and longer parallel sides. Shorter parallel side corresponds with first wrap edge 300. In embodiments, the longer parallel side is coincident with the upper end 70 of the body portion.

However, other shapes are possible for the first recess. For example, in some embodiments the body defines a first recess having a semicircular, rectangular, or square shape.

In embodiments, as shown in FIG. 1, outer width of tail portion 330 in a transverse direction increases with distance from body portion 20.

First wrap edge 300 defines midpoint $M_1$ and second wrap edge 270 defines midpoint $M_2$. Second wrap edge 270 defines quarterpoints $Q_1$ and $Q_2$, wherein $Q_1$ is midway between $M_2$ and a first end of second wrap edge 270, and $Q_2$ is midway between $M_2$ and a second end of second wrap edge 270.

In embodiments, as for example shown in FIG. 1, base 170 is bilaterally symmetrical about a line drawn between $M_1$ and $M_2$.

In embodiments, the second recess 60 has an acute trapezoid shape. In some such embodiments, the second recess has an isosceles trapezoidal shape as shown in FIG. 1. The trapezoid shape has a shorter parallel side and a longer parallel side 280. In embodiments, the longer parallel side is at the distal end 40, and the shorter parallel side corresponds with second wrap edge 270. However other shapes are possible. For example, in some embodiments the body defines a first recess having a semicircular, rectangular, or square shape. Second recess 60 is entirely located within and defined by tail portion 30 of body 170, wherein shorter side 270 is within tail portion 30.

Base 170 optionally includes one or more dividers 240. The embodiment shown in FIG. 1 includes one divider 240. In embodiments, base 170 comprises one divider, in embodiments two dividers, in embodiments three dividers. Each divider 240 is a ridge protruding in the vertical direction from top surface 220 and/or bottom surface 230, and is disposed longitudinally between first wrap edge 300 and second wrap edge 270. Accordingly, divider(s) 240, when present, divide first wrap area 90 and/or second wrap area 95 (not shown in FIG. 1) into two or more areas disposed longitudinally between first wrap edge 300 and second wrap edge 270. In the embodiment shown in FIG. 1 and FIG. 2, divider 240 runs from first wrap edge 300 to second wrap edge 270. However, in some embodiments divider 240 does not extend the whole length between the wrap edges.

Figure 2:
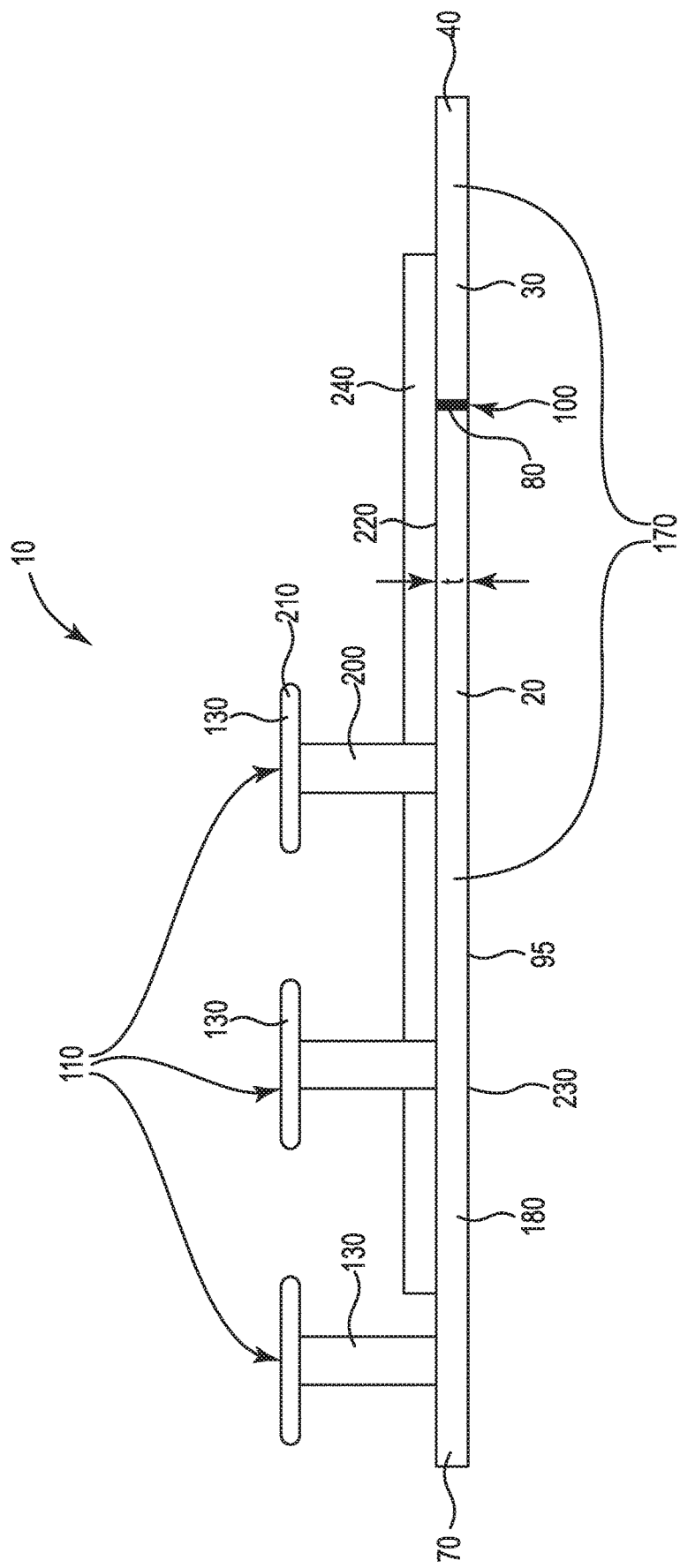
FIG. 2 is a schematic view in a second aspect of the holder shown in FIG. 1.

In the embodiment shown in FIG. 2, the pegs are shown extending in a direction perpendicular to the plane defined by the adjacent top surface of the base. However, in other embodiments, as set forth elsewhere herein, the post of one, some, or all of the pegs defines an angle of less than 90° to the plane.

Each peg defines a distance from the distal end of the peg to the plane defined by the adjacent top surface, the distance termed herein the "height" of a peg. In the embodiment shown in FIG. 2, the height of the pegs is uniform or substantially uniform in the first array of pegs. However, in other embodiments, the height of the pegs of the holder is not uniform.

In some embodiments, one or more of the dividers, when present, extends perpendicularly with respect to a plane defined by the adjacent top surface of the base. Each divider defines a distance from the plane to a point, line, or area of the divider distal to the plane, termed herein the "height" of the divider.

In FIG. 2 divider 240 defines a height less than the height of the pegs. However in some first embodiments that include at least one divider, the at least one divider extends from the top surface of the base to a height equal to or greater than the pegs. In such embodiments, any number of the dividers, when present, may have a height equal to or greater than all of the pegs. This arrangement has the advantage that the divider or dividers can protect the pegs from impact, for example an impact sustained by dropping the holder or an item impacting the holder.

In embodiments, one or more dividers 240 also acts to stiffen base 170 as well as acting as a segregation rail for first wrap area 90 or second wrap area 95. One or more dividers are useful in stiffening the base, and advantageously decrease the flexibility of the base at a given base thickness. This means that the base can be made with a reduced thickness, t, and accordingly from less material thereby reducing cost. As a segregation rail, the divider can assist in keeping straps stored on the device separate and/or untangled.

In some embodiments, base 170 comprises a divider extending from top surface 520, a divider extending from bottom surface 530, or a divider extending from the top surface and a divider extending from the bottom surface.

The holder further comprises first array of pegs 110 and second array of pegs 120, wherein each peg 130 of the first array and the second array extends from top surface 220 of base 170. In the embodiments shown in FIG. 1-3, each peg 130 extends vertically from top surface 220 (in a direction perpendicular or substantially perpendicular to the top surface), and first array of pegs 110 and second array of pegs 120 are disposed on opposing sides of the first wrap area 90, each array of pegs extending between upper end 70 and lower end 80 of body portion 20. However, in some embodiments arrays of pegs also extend from bottom surface 230.

In embodiments, holder 10 comprises one array of pegs, in embodiments two arrays of pegs, in embodiments, three arrays of pegs, or in embodiments four arrays of pegs. In embodiments a maximum of two arrays extend from the top surface, the bottom surface, or both the top surface and the bottom surface. When two arrays extend from the top surface or the bottom surface, each array of the two is arranged on opposing sides of the wrap area. Stated differently, the entirety of each slot is offset with respect to the winding track, and no part of any slot is located within first and/or second wrap areas.

In the embodiment shown in FIG. 1, first array 110 is proximal first edge 180 and second array 120 is proximal second edge 190. However, first array 110 and second array 120 in embodiments may be further from edges 180 and 190 respectively, with the proviso that the arrays are not located within first wrap area 90.

In the embodiment in FIG. 1, first array 110, second array 120, first edge 180, and second edge 190 are parallel or substantially parallel (to each other). However, other arrangements are possible. For example, each of first and/or second arrays may extend in a diagonal direction with respect to upper and lower ends and first and second edges. In some embodiments, each of first and second arrays is linear, that is the pegs are disposed in a straight line or substantially in a straight line. However, in other embodiments, the pegs in each array may be disposed on an arc, for example and arc about $M_1$, $M_2$, $Q_1$, or $Q_2$.

In embodiments, first and second edges are parallel or substantially parallel to each other, and each of first and second arrays is linear, and at an angle, y to first and second edges. In such embodiments, the distance between the first array and first edge 180 proximal to lower end 80 is less than the distance from the first array to first edge 180 proximal to upper end 70. The distance between the second array and second edge 190 proximal to lower end 80 is less than the distance between the second array and second edge 190 proximal to upper end 70. Stated differently, as viewed in the aspect shown in FIG. 1, in such embodiments the first array extends from bottom left to top right and is located between the first edge and the first wrap area, and the second array extends from bottom right to top left and is located between the first wrap area and the second edge. In some such embodiments, y is 0°, in embodiments, 10°, in embodiments 15°, in embodiments 20°, in embodiments 30°, in embodiments 40°, in embodiments 45°, in embodiments 50°, in embodiments 60°, in embodiments 70°.

In embodiments, each array of first array 110 and/or second array 120 comprises or consists of one peg, in embodiments two pegs, in embodiments three pegs, in embodiments four pegs, in embodiments five pegs, in embodiments six pegs, in embodiments seven pegs, in embodiments eight pegs, in embodiments nine pegs, or in embodiments ten pegs.

In the embodiment shown in FIG. 1: first edge 180 and second edge 190 are parallel or substantially parallel to each other, body portion 20 defines maximum width W, and base 170 defines length L. The size of holder 10 is not particularly limited. Stated differently, the holder can be scaled to accommodate longer straps, larger hooks, and more straps.

In embodiments, L is 8 inches to 36 inches, in embodiments 8 inches to 30 inches, in embodiments 8 inches to 24 inches, in embodiments 10 inches to 16 inches, in embodiments about 12 inches, or in embodiments 12 inches.

In embodiments, W is 5 inches to 24 inches, in embodiments 5 inches to 20 inches, in embodiments 5 inches to 16 inches, in embodiments 7 inches to 11 inches, in embodiments 7 inches to 9 inches, in embodiments about 8 inches, or in embodiments 8 inches.

In embodiments, the ratio of L:W is about 3:1 to about 1:1, in embodiments about 2:1 to about 1:1, or in embodiments about 3:2.

In some embodiments, pegs 130 are evenly spaced in array 110 and/or in array 120. In some such embodiments, spacing between adjacent pegs $A_2$ and $A_3$ is about 4 inches to about 1 inch, in embodiments about 3 inches to about 1 inch, or in embodiments about 2.5 inches. However, other dimensions for $A_2$ and $A_3$ are possible. $A_2$ and $A_3$ can be larger or smaller depending on the hook size. Indeed, each array can include more than or less than three pegs, as set forth herein.

Further, the spacing between adjacent pegs in each array can differ from one pair of adjacent pegs to another, so that the holder can accommodate hooks of a variety of sizes simultaneously. Stated differently, in some embodiments, pegs in an array are not evenly spaced.

Referring to FIG. 1: In embodiments, $A_1$ is 0.5 inches to 2 inches, or in embodiments about 1 inch.

In embodiments, $A_2$ is 2 inches to 5 inches, in embodiments 2 inches to 4 inches, in embodiments 2 inches to 3 inches, or in embodiments about 2.5 inches. In embodiments, $A_3$ is 2 inches to 5 inches, in embodiments 2 inches to 4 inches, in embodiments 2 inches to 3 inches, or in embodiments about 2.5 inches. In embodiments, $A_4$ is about 2 inches to about 6 inches, in embodiments about 2 inches to about 5 inches, in embodiments about 2 inches to about 4 inches, or in embodiments about 3 inches.

In embodiments, as shown in FIG. 1, body portion 20 defines a maximum length B in the longitudinal direction that is the distance between upper end 70 and lower end 80.

In embodiments, as shown in FIG. 1, tail portion defines a maximum length T in the longitudinal direction that is the distance between lower end 80 of the body portion and distal end 40, wherein L=B+T. In embodiments, the ratio B:T is 4:1 to 1:1, in embodiments 4:1 to 2:1, or in embodiments about 3:1.

In embodiments, waist 100 defines a traverse width, ω, of about 3 inches to about 6 inches, in embodiments about 4 inches to about 5 inches, in embodiments about 4 inches to about 4.5 inches, in embodiments about 4.4 inches, or in embodiments about 4.375 inches.

In embodiments width $S_1$ of first wrap edge 300 in a transverse direction is about 5 inches to about inch, in embodiments about 4 inches to about 2 inches, or in embodiments about 3 inches.

In embodiments, width $S_2$ of second wrap edge 270 is the same or substantially the same as width $S_1$ of first wrap edge 300.

In embodiments width $S_2$ of second wrap edge 270 in a transverse direction is about 5 inches to about inch, in embodiments about 4 inches to about 2 inches, or in embodiments about 3 inches.

In embodiments, leg span $S_3$ (transverse distance between legs 290 at distal end 40) is about 2 inches to about 6 inches, in embodiments about 3 inches to about 5 inches, in embodiments about 3 inches to about 4 inches, or in embodiments about 3.75 inches.

Span $S_4$ is width of first recess 50 at upper end 70 of body portion.

In embodiments span $S_4$ is equal to or approximately equal to leg span $S_3$.

In embodiments, span $S_4$ (transverse width of first recess 50 at upper end 70) is about 2 inches to about 6 inches, in embodiments about 3 inches to about 5 inches, in embodiments about 3 inches to about 4 inches, or in embodiments about 3.75 inches.

Span $S_5$ is the width of tail portion 30 at distal end 40.

In embodiments, depth $D_1$ (depth in the longitudinal direction) of first recess 50 is 0.5 inches to about 5 inches, in embodiments about 1 inch to about 4 inches, in embodiments about 1 inch to about 3 inches, in embodiments about 1 inch to about 2 inches, or in embodiments about 1.5 inches.

In embodiments, depth $D_2$ (depth in the longitudinal direction) of second recess 60 is 0.5 inches to about 5 inches, in embodiments about 1 inch to about 4 inches, in embodiments about 1 inch to about 3 inches, in embodiments about 1 inch to about 2 inches, or in embodiments about 1.5 inches.

In some embodiments, for example the embodiment shown in FIG. 1, $D_2$ is less than T. However in other embodiments, $D_2$ is greater than T, that is second recess 60 extends into body portion 20.

With reference to FIG. 1 and further reference to FIG. 2: FIG. 2 is a schematic side view of the holder embodiment depicted in FIG. 1. In the embodiments shown in the drawings, for example FIG. 2, base 170 is planar or substantially planar and defines thickness t. In embodiments, thickness t is about 0.05 inches to about 1 inch, in embodiments about 0.05 inches to about 0.5 inches, in embodiments about 0.1 inches to about 0.5 inches, in embodiments about 0.1 inches to about 0.3 inches, in embodiments about 0.1 inches to about 0.2 inches, in embodiments about 0.13 inches to about 0.18 inches, in embodiments about 0.16 inches, in embodiments about 0.125 inches, or in embodiments 0.125 inches.

In embodiments, the ratio t/W is about 0.005 to about 0.1, in embodiments about 0.005 to about 0.05, in embodiments about 0.01 to about 0.02, or in embodiments about 0.015 to about 0.02.

In embodiments, thickness t is about 0.125 inches or is 0.125 inches and the base comprises, consists of, or consists essentially of polyvinyl chloride (PVC). In embodiments, the PVC is unplasticized PVC (u-PVC).

Each peg 130 extends from top surface 220 in away from top surface. Each peg 130 comprises, consists of, or consists essentially of a post 200. In the drawings, each post extends vertically away from the top surface and is perpendicular or substantially perpendicular to the top surface. However, in embodiments the post can be set at an angle to the vertical direction, for example the post of a peg can extend from the top surface and point away from lower end 80 of the body portion and/or towards first edge 180 or second edge 190.

In embodiments, for example the embodiment shown in FIG. 1 and FIG. 2, each peg comprises post 200 and cap 210. Cap 210 is a portion of peg 130 that is wider in at least one dimension parallel to top surface 220 than post 200. In the embodiment shown in FIG. 1 and FIG. 2, cap is disc-shaped. However, other shapes are possible with the proviso that cap 210 is wider in in at least one dimension parallel to top surface 220 than post 200. For example, in embodiments the cap is disc-shaped but defines a missing segment.

In other embodiments (not shown in the drawings), each peg includes a post that widens towards the end of the post distal to the base. In such embodiments, the width of the post in a direction parallel to the top surface of the base gradually increases with distance from the top surface. In embodiments, post has a conical or frustoconical shape, with the wider portion distal to the top surface of the base. In such embodiments, the conical or frustoconical shape is straight sided or radiused (i.e. flared).

In some embodiments, a cap is not present, as it is not necessary because a conical post provides a widening in the peg that assists in preventing the hook of a strap from disengaging with the peg by slipping off the post.

In some embodiments, base 170, first array 110, and second array 120 are a single piece, that is during the manufacturing of the holder, the base and pegs are molded, cast, or otherwise formed as a single piece.

In embodiments, the pegs are formed in place during the manufacturing process of the holder, for example by molding, casting, bonding, and/or welding. In other embodiments, pegs 130 are attached to base 170. In some such embodiments, different materials are used to form the base 170 and pegs 130; thus, for example, base 170 is formed from a thermoplastic while pegs 130 are formed from a metal. In some such embodiments, the post 200 of each peg passes through a hole defined by base 170 and is affixed to base 170 by means known in the art. For example, post 200 may define a screw thread, and nuts may be screwed onto the post on opposing top and bottom sides of base 170 and fastened against top surface 220 and bottom surface 230. Alternatively, post 200 is affixed to base 170 using an adhesive material.

In embodiments, the holder of the first embodiments further comprises a loop encircling waist 100. In embodiments, the loop is selected from a loop of webbing, a loop of elastic cord (a bungee loop), a loop of string, and a loop of ribbon. With reference to FIG. 1, the loop defines a circumference less than 2W+2t and less than $2S_5+2t$. In the case of an elastic loop such as a bungee loop, the loop defines a circumference less than 2W+2t and less than $2S_5+2t$ in its unextended state.

In embodiments, the loop is tightened around the waist so that the loop is under a non-zero tension. In embodiments, the loop is a cord, webbing, string, or lock tie (zip tie). In some embodiments, the loop is a bungee loop 100. Bungee loop 100 is a loop of elastic material (bungee cord) that can be stretched by hand, and is designed and adapted and sized to stretch over legs 290 and provide tension when stretched over waist 100.

In embodiments, there is provided a kit, the kit comprising, consisting of, or consisting essentially of a first component and a second, separate, component. In embodiments, the first component comprises, consists of, or consists essentially of any one of the embodiments of a holder as described herein. In embodiments, the second component comprises, consists of, or consists essentially of any one or more loops as described herein.

Figure 9A:
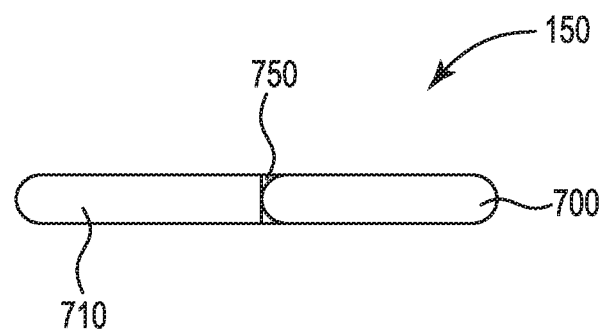
FIGS. 9A and 9B are views in a first and a second aspect respectively of a type of S-hook.
Figure 9B:
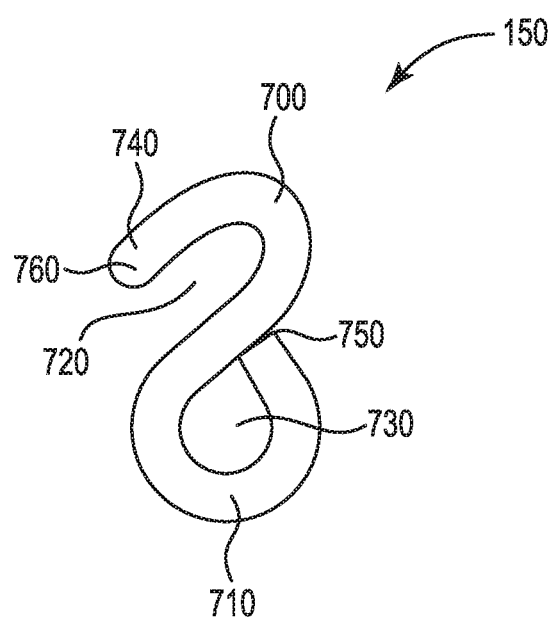
Figure 10:
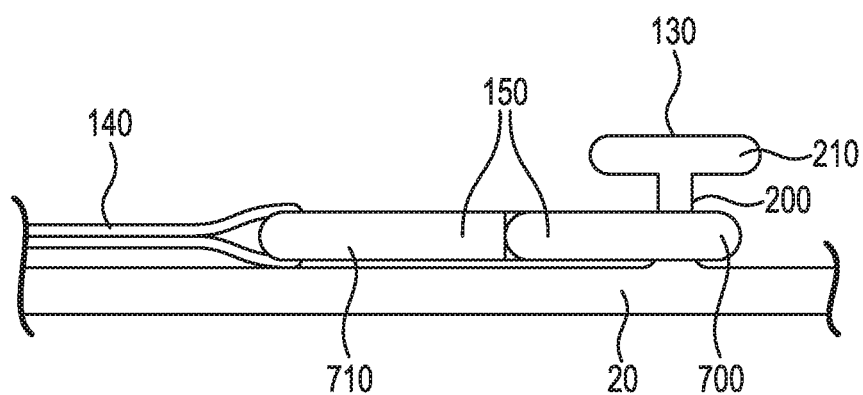
FIG. 10 is a schematic view of an S-hook engaged with a peg of a first embodiment of a holder.

The holder of the first embodiments is particularly well suited to hold S-hook terminated straps, D-rings, snap hooks, carabiners, and the like. S-hooks are well-known in the art. One example of an S-hook is shown in FIG. 9A (a lateral aspect) and FIG. 9B (a vertical aspect). As shown in FIG. 9A, S-hooks are relatively flat, and bend 700 of an S-hook 150 can engage with post 200, while the hook lies parallel to top surface 220 and/or between 0° and 450 to top surface 220, as shown for example in FIG. 10 and FIG. 3.

Figure 3:
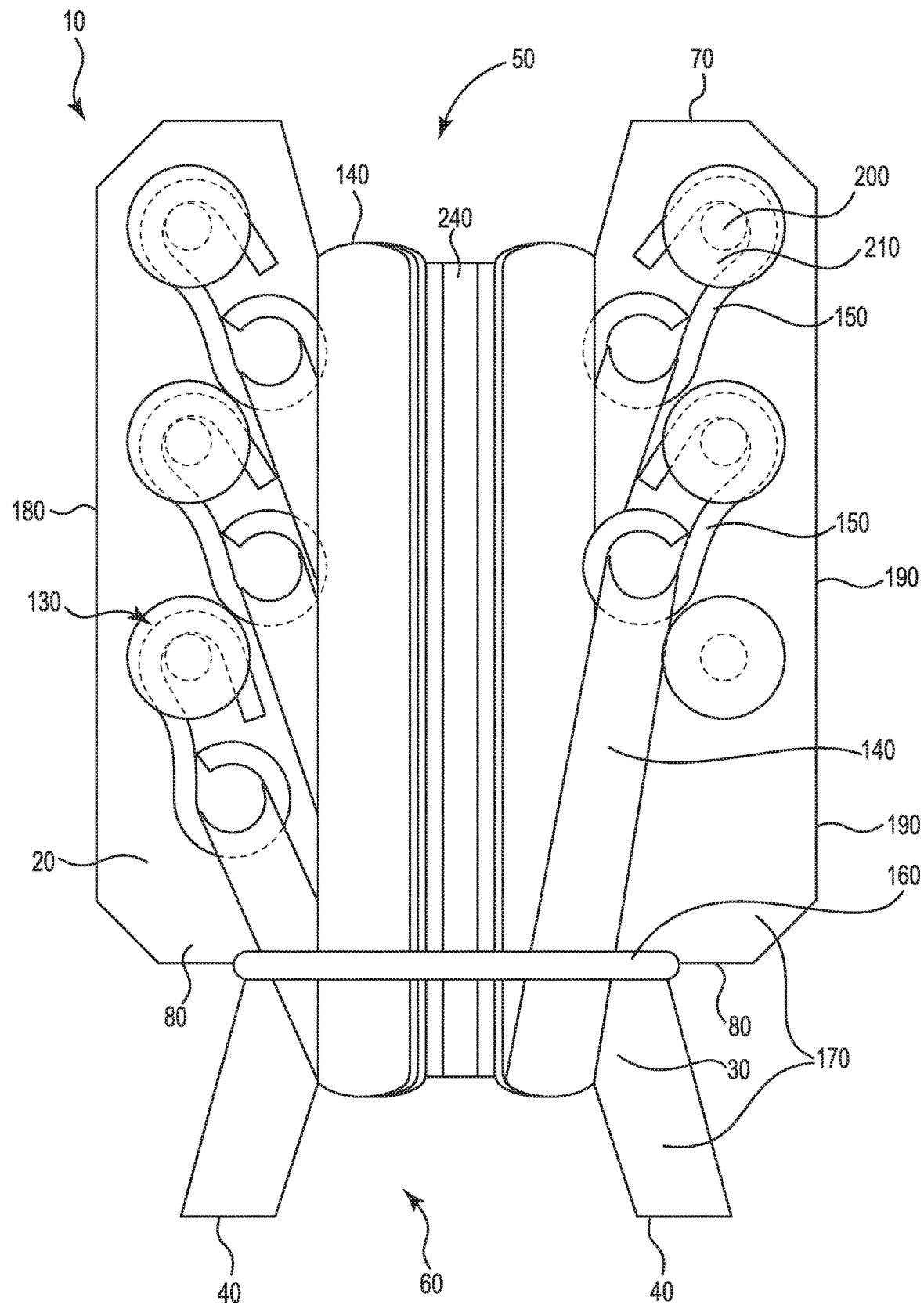
FIG. 3 is a schematic view in a first aspect of a first embodiment of a holder including a bungee loop and with five straps wrapped on the holder.

Referring to FIG. 1, FIG. 2, and further to FIG. 3: FIG. 3 is a schematic view of the holder of FIG. 1 and including five S-hook terminated straps wound thereon. Each strap 140 includes an S-hook 150 attached thereto. Each peg 130 is positioned, designed, and adapted to receive and engage with an S-hook. Each S-Hook 150 is hooked over a separate post 200. Each cap 210 (if present) assists in preventing disengagement of an S-hook from a peg.

With reference to a single strap: S-Hook 150 is engaged with a peg 130, by hooking the S-hook over post 200 of the peg. The strap 140 is positioned so that it leads from the S-hook to second recess 60, and the strap is tensioned and wound into second recess 60, wrapped around second wrap edge 270, then through second wrap area 95, then through first recess 50 and around first wrap edge 300, through first wrap area 90, and into second recess 60, where it is wound around second wrap edge 270 and thence back to second wrap area 95. In that fashion, wrapping is continued as long as necessary to wrap the whole strap, thereby providing successive loops of the strap through first wrap area 90, around second wrap edge 270, through second wrap area 95, and around first wrap edge 300 back to first wrap area 90. In embodiments, sufficient tension is applied during winding that large loops around first wrap edge 300 and/or second wrap edge 270 are avoided.

In embodiments, wrapping is continued in the above described fashion around the winding track until the entire length of the strap is disposed around the holder.

When one or more straps have been wound around holder 10 as described, a loop such as bungee loop 160 is positioned encircling and tensioned around waist 100 and the straps wound onto the holder.

In some embodiments, bungee loop 160 is positioned as follows: A bungee cord is looped around waist 100, stretched, and the two ends fasted and/or tied together. In other embodiments, bungee cord is already fashioned into bungee loop 160, the bungee loop is stretched over legs 290, and slid until bungee loop 160 encircles waist 100 and all straps passing thereover.

Advantageously and unexpectedly, waist 100 holds a loop such as the bungee loop in place encircling the waist, and the loop such as the bungee loop 160 thus secured around waist 100 prevents straps from unwinding, prevents the straps from sliding over one another, and prevents the straps becoming untensioned, thereby holding the wound straps securely to holder. The loop is securely disposed around the waist, encircles the waist, and held at or proximal to the waist, because the distance between opposing sides of the holder is at a minimum at the waist and the loop defines a circumference less than the width of the base proximal to the waist. The loop traverses the winding track transversely and encompasses straps wound onto the winding track. Accordingly, the loop retains and secures loops of straps wound onto the winding track and prevents unintended unwinding of the straps.

In embodiments, there is provided a method, the method comprising, consisting of, or consisting essentially of: (i) Providing a holder of the first embodiments and at least one hook-terminated strap, the hook-terminated strap comprising a webbing belt and a hook; (ii) engaging the hook of the hook-terminated strap with a peg of the holder; (iii) passing the strap under tension over the waist, through the second recess and around the second wrap edge, over the second wrap area, through the first recess and around the first wrap edge, and over the first wrap area; and (iv) positioning and tensioning a loop around the waist, whereby the loop is under tension and encircles the waist and the strap. In embodiments, step (iii) is repeated any number of times from 0 times to 50 times, in embodiments, from 0 times to 40 times, in embodiments from 0 times to 30 times, in embodiments from 0 times to 20 times, in embodiments from 0 times to 10 times, in embodiments from once to 50 times, in embodiments from once to 40 times, in embodiments from once to 30 times, in embodiments from once to 20 times, or in embodiments from once to 10 times.

In embodiments, the hook-terminated strap is an S-hook terminated strap, a D-ring terminated strap, a snap hook terminated strap, or a carabiner-terminated strap.

In embodiments, the cord is a bungee cord.

In some embodiments, the loop is positioned by tying and/or positioning and tensioning a cord or lock tie around waist and all windings of the strap, thereby forming the loop and encircling the waist and strap windings passing over the waist. In other embodiments, the loop is positioned by stretching an extensible loop of cord such as a bungee loop around the legs and sliding the loop to the waist.

Second Embodiments

The Second Embodiments will now be described in detail with reference to the drawings.

Although second embodiments are described in detail herein with respect to J-hooks, the use of the holder of the second embodiments is not limited to J-hook terminated straps.

Figure 4:
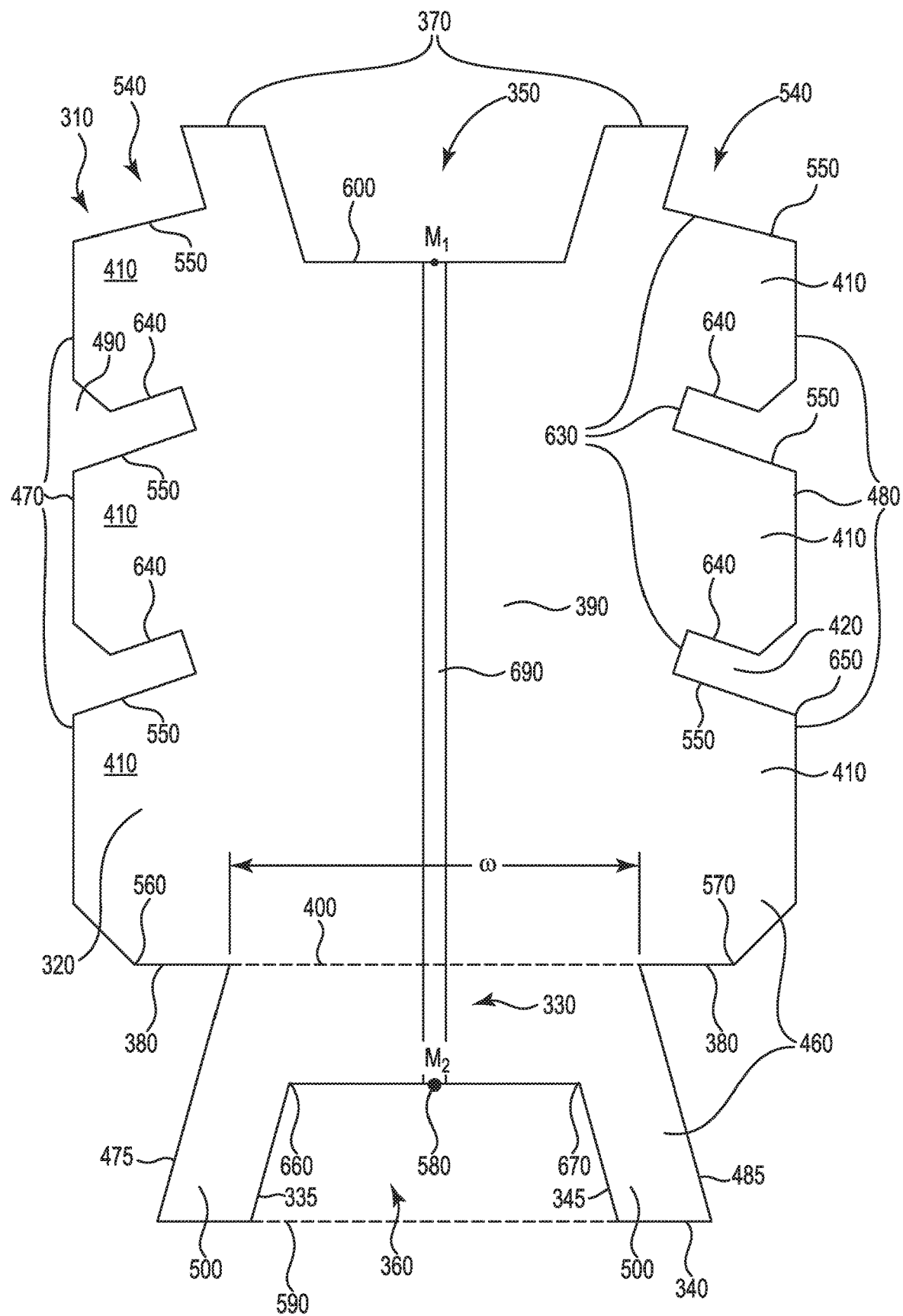
FIG. 4 is a schematic view in a first aspect of a second embodiment of a holder.
Figure 5:
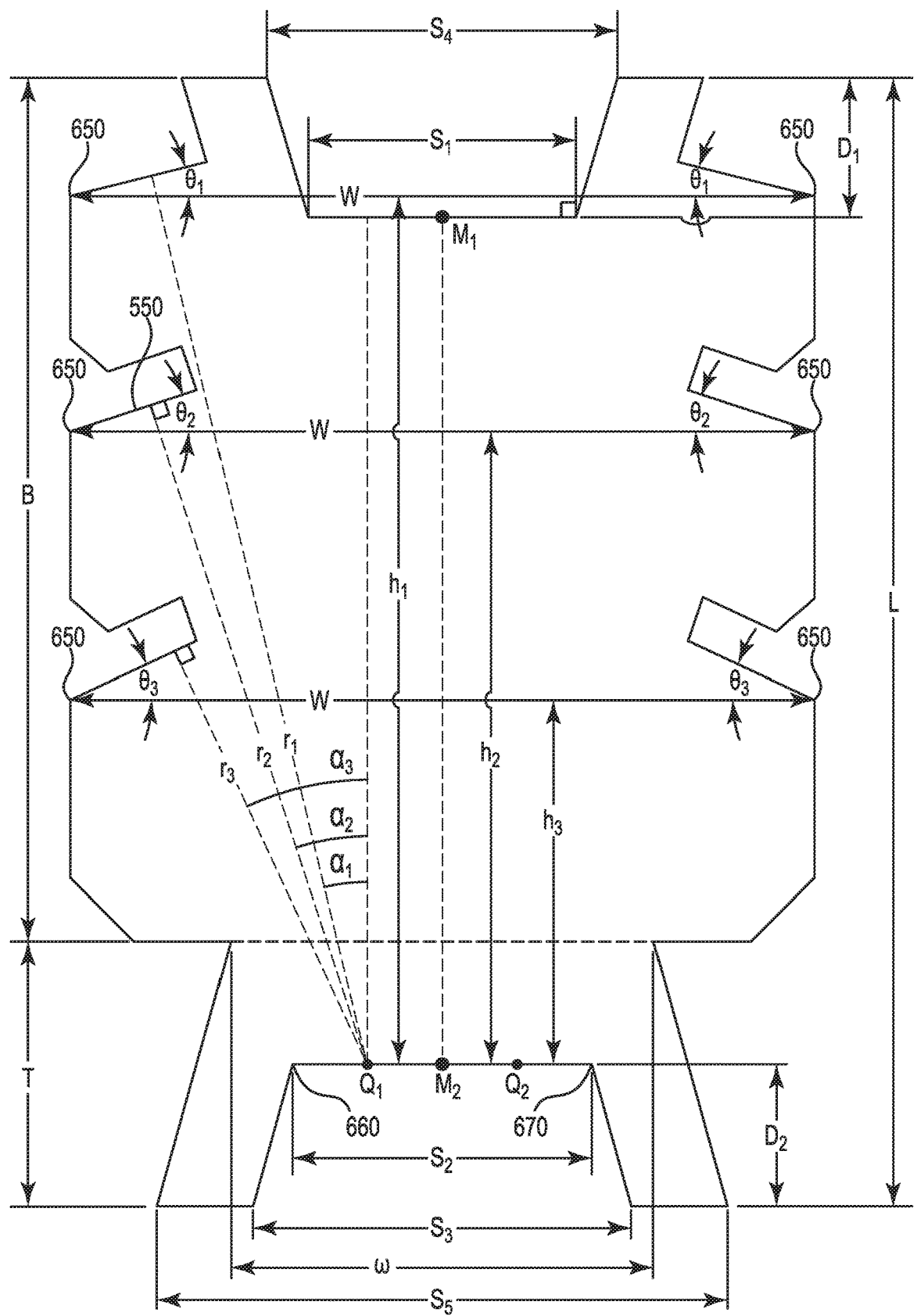
FIG. 5 is a schematic view in a first aspect of a holder according to a second embodiment.

With reference to FIG. 4 and FIG. 5: Each of FIG. 4 and FIG. 5 is a view of a holder according to second embodiments. The holder 310 comprises, consists of, or consists essentially of base 460. Base 460 includes a body portion 320 and a tail portion 330. Body portion 320 defines a upper end 370 and lower end 380, wherein the lower end is horizontally opposed to the upper end. Lower end 380 extends in a straight line between a first terminus 560 and second terminus 570. Body portion 320 defines first edge 470 and second edge 480, wherein the second edge is horizontally opposed to the first edge in a transverse direction. In embodiments, body portion 320 defines a rectangular shape or substantially rectangular shape. Examples of substantially rectangular shapes include the shape shown in FIG. 4, wherein body portion 20 defines the shape of a rectangle with corners removed. Another substantially rectangular shape is a shape obtained by rounding the corners of a rectangle. Other shapes are possible, for example a body portion may define a stadium shape, elliptical shape, oval shape, polygonal shape, square shape, or a circular shape.

Tail portion 330 projects or extends from lower end 380 of body portion 320 to distal end 340 of the base, wherein distal end 340 is distal to the body portion. Where tail portion 330 abuts body portion 320, the tail portion is narrower than the body portion in the transverse direction whereby waist 400 is defined where body portion 320 and tail portion 330 abut. Waist 400 is a local minimum in the width of base 460 in the transverse direction. In embodiments shown in FIG. 4, tail portion 330 is not proximal first terminus 560 and is not proximal second terminus 570, and accordingly the base narrows from both sides towards the waist, as shown in FIG. 4.

Moving away from waist 400 in a longitudinal direction toward either of upper end 370 or distal end 340, the width of base 460 increases in a transverse direction, for example as shown in FIG. 4.

Waist 400 is a narrow point in transverse direction in base 460, wherein a bungee loop (not shown in FIG. 4 and FIG. 5) may encircle waist 400.

Tail portion defines first outer edge 475 and second outer edge 485.

In the embodiments shown in the drawings, each of first outer edge 475 of tail portion and second outer edge 485 of tail portion is linear or substantially linear, and first and second outer edges diverge from one another. In the embodiment shown in FIG. 4, the acute angle between first outer edge 475 and lower end 380 of the body portion is 75°, i.e. first outer edge 475 is 15° to the longitudinal direction and the acute angle between second outer edge 485 and lower end 80 is 75° (i.e. 150 to the longitudinal direction). However, in other embodiments, the angle can vary, with the proviso that the first and second outer edges diverge from each other moving towards distal end 340 (i.e. distance between first and second outer edges is greater proximal to the distal end than proximal to the lower end of the body portion).

In embodiments, the acute angle between the first outer edge and the lower end of the body portion is about 80° to about 89°, in embodiments about 89° to about 25°, in embodiments about 80° to about 30°, in embodiments about 80° to about 40°, in embodiments about 80° to about 50°, in embodiments about 80° to about 60°, in embodiments about 75°, in embodiments about 60°, in embodiments about 50 to about 60°, in embodiments about 40° to about 50°, in embodiments about 30° to about 40°.

In embodiments, the acute angle between the second outer edge and the lower end of the body portion is about 80° to about 89°, in embodiments about 89° to about 25°, in embodiments about 80° to about 30°, in embodiments about 80° to about 40°, in embodiments about 80° to about 50°, in embodiments about 80° to about 60°, in embodiments about 75°, in embodiments about 60° to about 70°, in embodiments about 50° to about 60°, in embodiments about 40° to about 50°, in embodiments about 30° to about 40°.

Any of the sharp angles shown in the figures can be radiused. For example, the angle where the lower end 380 of the body portion meets outer edge 475 and/or outer edge 485 may be sharp or radiused (rounded).

In some preferred embodiments, base 460 is a single piece, i.e. body portion 320 and tail portion 330 are portions of a single piece, base 460. Accordingly, in such embodiments base 460 can be molded as a single piece.

Base 460 defines a first recess 350 in upper end 370 of body portion 320 and second recess 360 in distal end 340. First recess 350 and second recess 360 are horizontally opposed in a longitudinal direction.

Base 460 includes first wrap area 390 and a second wrap area 395. First wrap area 390 is an area of top surface 520 of base 460, wherein wrap area 390 is located between first recess 350 and second recess 360. First wrap area 390 extends in a longitudinal direction from first recess 350 to second recess 360.

Base 460 also includes second wrap area 395 (not shown in FIG. 4). The second wrap area is an area of bottom surface 530 of base 170, wherein the second wrap area is located between first recess 350 and second recess 360. The second wrap area extends in a longitudinal direction from first recess 350 to second recess 360. The first wrap area and the second wrap area are equal or substantially equal to each other in area. In embodiments, the width in a transverse direction of the first wrap area, the second wrap area, the first wrap edge, and the second wrap edge are all equal or substantially equal.

In embodiments, the first recess 350 has an acute trapezoid shape. In some such embodiments, the first recess 350 has an isosceles trapezoid shape, as shown in FIG. 4 and in FIG. 5. The trapezoid shape has shorter and longer parallel sides. Shorter parallel side corresponds with first wrap edge 600. In embodiments, the longer parallel side is at the upper end 370 of the body portion.

In embodiments, second recess 360 has an acute trapezoid shape. In some such embodiments, the second recess has an isosceles trapezoidal shape as shown in FIG. 4 and FIG. 5. The trapezoid shape has a shorter parallel side and a longer 590 parallel side. In embodiments, the longer parallel side is at the distal end 340, and the shorter parallel side corresponds with second wrap edge 580.

First wrap edge 600 defines midpoint $M_1$ and second wrap edge 580 defines midpoint $M_2$. In embodiments, for example as shown in FIG. 4 and FIG. 5, base 460 is symmetrical about a line drawn between midpoint $M_1$ and midpoint $M_2$.

In the embodiment shown in FIG. 4, second recess 360 is entirely located within and defined by tail portion 330 of body 460, wherein second wrap edge is parts of tail portion 330. However, in other embodiments (not shown), second recess 360 is located within both tail portion 330 and body portion 320, wherein the second recess 360 extends from distal end 340 into body portion 320 and second wrap edge 580 is located within body portion 320.

In the embodiment shown in FIG. 4 and FIG. 5: first edge 470 and second edge 480 are parallel or substantially parallel to each other, body portion 320 defines maximum width W, and base 460 defines length L. The size of holder 10 is not particularly limited.

In embodiments, L is about 8 inches to about 36 inches, in embodiments about 8 inches to about 30 inches, in embodiments about 8 inches to about 24 inches, in embodiments about 10 inches to about 16 inches, in embodiments about 12 inches, or in embodiments 12 inches.

In embodiments, W is about 5 inches to about 24 inches, in embodiments about 5 inches to about 20 inches, in embodiments about 5 inches to about 16 inches, in embodiments about 7 inches to about 11 inches, in embodiments about 7 inches to about 9 inches, in embodiments about 8 inches, or in embodiments 8 inches.

In embodiments, the ratio of L:W is about 3:1 to about 1:1, in embodiments about 2:1 to about 1:1, or in embodiments about 3:2.

In embodiments, as shown in FIG. 5, body portion 320 defines a maximum length B in the longitudinal direction that is the distance between upper end 370 and lower end 380.

In embodiments, as shown in FIG. 5, tail portion defines a maximum length T in the longitudinal direction that is the distance between lower end 380 of the body portion and distal end 340, wherein L=B+T. In embodiments, the ratio B:T is 4:1 to 1:1, in embodiments 4:1 to 2:1, or in embodiments about 3:1.

In embodiments, waist 400 defines a traverse width, ω, of about 3 inches to about 6 inches, in embodiments about 4 inches to about 5 inches, in embodiments about 4 inches to about 4.5 inches, in embodiments about 4.4 inches, or in embodiments about 4.375 inches.

In embodiments, the ratio ω/W is about 0.1 to about 0.95, in embodiments about 0.2 to about 0.9, in embodiments about 0.3 to about 0.7, in embodiments about 0.4 to about 0.7, in embodiments about 0.5 to about 0.7, in embodiments about 0.5 to about 0.65, in embodiments about 0.5 to about 0.6, or in embodiments about 0.55.

In embodiments width $S_1$ of first wrap edge 600 in a transverse direction is about 5 inches to about 1 inch, in embodiments about 4 inches to about 2 inches, or in embodiments about 3 inches.

In embodiments, width $S_2$ of second wrap edge 580 is the same or substantially the same as width $S_1$ of first wrap edge 600. In some such embodiments, first and second wrap edges are aligned in a transverse direction.

In embodiments width $S_2$ of second wrap edge 600 in a transverse direction is about 5 inches to about 1 inch, in embodiments about 4 inches to about 2 inches, or in embodiments about 3 inches.

In embodiments, leg span $S_3$ (transverse distance between legs 500 at distal end 340) is about 2 inches to about 6 inches, in embodiments about 3 inches to about 5 inches, in embodiments about 3 inches to about 4 inches, or in embodiments about 4 inches.

Span $S_4$ is width of first recess 350 at upper end 370 of body portion.

In embodiments span $S_4$ is equal to or approximately equal to leg span $S_3$.

In embodiments, span $S_4$ (transverse width of first recess 350 at upper end 370) is about 2 inches to about 6 inches, in embodiments about 3 inches to about 5 inches, in embodiments about 3 inches to about 4 inches, or in embodiments about 3.75 inches.

Span $S_5$ is the width of tail portion 330 at distal end 340.

In embodiments, depth $D_1$ (depth in the longitudinal direction) of first recess 350 is 0.5 inches to about 5 inches, in embodiments about 1 inch to about 4 inches, in embodiments about 1 inch to about 3 inches, in embodiments about 1 inch to about 2 inches, or in embodiments about 1.5 inches.

In embodiments, depth $D_2$ (depth in the longitudinal direction) of second recess 360 is 0.5 inches to about 5 inches, in embodiments about 1 inch to about 4 inches, in embodiments about 1 inch to about 3 inches, in embodiments about 1 inch to about 2 inches, or in embodiments about 1.5 inches. In some embodiments, for example the embodiment shown in FIG. 4 and FIG. 5, $D_2$ is less than T. However in other embodiments, $D_2$ is greater than T, that is second recess 360 extends into body portion 320.

Base 460 optionally includes one or more dividers 690. The embodiment shown in FIG. 4 includes one divider 690. In embodiments, base 460 comprises one divider, in embodiments two dividers, in embodiments three dividers. Each divider 690 is a ridge protruding in the vertical direction from top surface 520 or bottom surface 530, and is disposed longitudinally between first wrap edge 600 and second wrap edge 580. Accordingly, divider(s) 690, when present, divide first wrap area 390 and/or second wrap area 395 into two or more areas disposed longitudinally between first wrap edge 600 and second wrap edge 580. In the embodiment shown in FIG. 4 (optional divider 690 is omitted from FIG. 5 and FIG. 6), divider 690 runs from first wrap edge 600 to second wrap edge 580. However, in some embodiments divider 690 does not extend the whole length between the wrap edges.

Advantageously each divider 690 also acts to stiffen base 460 as well as acting as a segregation rail for first wrap area 390 or second wrap area 395. One or more dividers are useful in stiffening the base, and advantageously decrease the flexibility of the base at a given base thickness. This means that the base can be made with a reduced thickness, t, and accordingly from less material thereby reducing cost. As a segregation rail, the divider can assist in keeping straps stored on the device separate and/or untangled. In some embodiments, base 460 comprises a divider extending from top surface 520, a divider extending from bottom surface 530, or a divider extending from the top surface and a divider extending from the bottom surface.

Body portion 320 of base 460 defines first array of slots 620 and second array of slots 630. Each slot 630 is a recess in first edge 470 or second edge 480, and extends from the edge towards first wrap area 390.

Each slot has an upper edge 640 and a lower edge 550. In embodiments, any distance between the upper edge 640 and midpoint $M_2$ is greater than any distance between the lower edge 550 and midpoint $M_2$. In embodiments, any distance between the lower edge 550 and midpoint $M_2$ is less than any distance between the upper edge 640 and midpoint $M_2$.

In some embodiments, at least a portion of the upper edge 640 and at least a portion of the lower edge 550 are parallel or substantially parallel to each other. In some embodiments, each slot id wider where it meets first edge 470 of body portion or second edge 480 of body portion.

In embodiments, each array of first array 620 and/or second array 630 is an array of one slot, an array of two slots, an array of three slots, and array of four slots, an array of five slots, an array of six slots, an array of seven slots, an array of eight slots, an array of nine slots, or in embodiments an array of ten slots.

In embodiments, each of first array 620 and/or second array 630 includes one shoulder opening 540. Stated differently, in such embodiments base 460 defines one shoulder opening 540 or two shoulder openings 540. Shoulder opening 540 is located between first edge 470 or second edge 480 and upper end 370.

Shoulder opening 540 is a slot that lacks an upper edge 640.

Each slot 420 is defined by body portion of base. Each slot 420 is open at either first edge 470 or second edge 480. Each slot that is not a shoulder opening has a lower edge 550 and an upper edge 640. In embodiments, lower edge 550 is linear, and at least part of upper edge 640 is linear. In some such embodiments, the lower edge and the at least part of the upper edge are parallel to one another.

In embodiments, lower edge 550 of slot 420 is linear and forms an angle of 90+θ to edge 470 or edge 480, as shown in FIG. 5. Lower edge 550 of slot 420 intersects with edge 470 or edge 480 at intersection 650. Intersection 650 defines a longitudinal distance from second wrap edge 580 of h.

The optimal range for angle θ depends on the distance (marked h in FIG. 5) of the intersection of a slot to the second wrap edge. If θ is too high, e.g. the slot is too close to parallel with first edge 470 or second edge 480, then the hook of a strap will not be effectively retained in the slot and the hook may slip out. However, while there is an upper limit to the positive value of θ for a particular slot, an angle of greater than 0° can allow for easy removal of the hook of a strap from a slot without having to remove the remainder of the strap, i.e. it can provide easier release.

In embodiments, base 460 is designed and adapted wherein for each slot angle θ is less than 100°-β, in embodiments less than 90°-β, in embodiments less than 85°-β, in embodiments less than 80°-β, in embodiments between 90°-β and −80°, in embodiments between 85°-β and −80°, in embodiments between 80°-β and −80°, in embodiments between 90°-β and 0°, in embodiments between 85°-β and 0°, or in embodiments between 80°-β and 0°, wherein tan β=2·h/W.

In embodiments, base 460 is designed and adapted wherein for each slot wherein θ is between 100-β and 80-β, wherein tan β=2·h/W, where β is an angle in degrees.

In embodiments, upper end 370 and lower end 380 run in a transverse direction and are parallel or substantially parallel to each other; first edge 470 and second edge 480 run in a longitudinal direction and are parallel to or substantially parallel to each other, and first and second edges are perpendicular or substantially perpendicular to upper and lower ends.

With reference to FIG. 5, in embodiments base 460 defines three pairs of opposing slots in edges 470 and 480. In some such embodiments, W is about 7.5 inches to about 8.5 inches, in embodiments about 8 inches, or in embodiments is 8 inches.

In embodiments, for a first pair of slots $h_1$ is about 9 inches to about 9.5 inches, about 9.125 inches, or is 9.125 inches; and angle $θ_1$ is about 1 to about 31°, about 6° to about 26°, about 11° to about 21°, or about 16°.

In embodiments, for a second pair of slots $h_2$ is 6.75 inches to 6.25 inches, about 6.5 inches, or is 6.5 inches; and angle $θ_2$ is about 7° to about 37°, about 12° to about 32°, about 17° to about 27°, or about 22°.

In embodiments, for a third pair of slots $h_3$ is 4 inches to 3.5 inches, about 3.75 inches, or is 3.75 inches; and angle $θ_3$ is about 17° to about 47°, in embodiments about 22° to about 42°, in embodiments about 27° to about 37°, or in embodiments about 32°.

Figure 8:
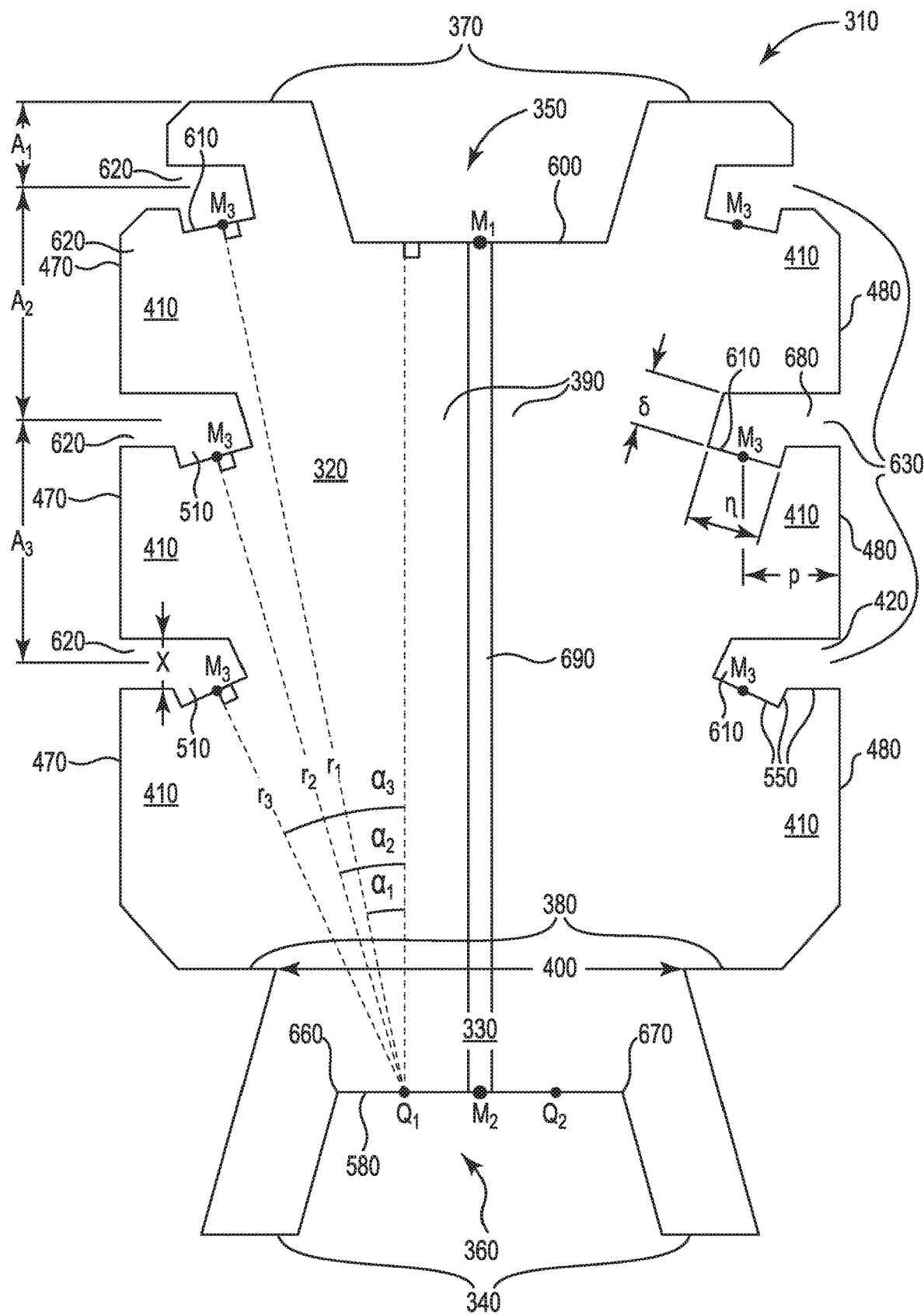
FIG. 8 is a view of a second embodiment of a holder featuring seating notches as described herein.

Second wrap edge 580 defines first end 660 and second end 670. $M_2$ is the midpoint of second wrap edge 580. Quarterpoint $Q_1$ is a point midway between first end 660 and midpoint $M_2$. Quarterpoint $Q_2$ is a point midway between midpoint $M_2$ and second end 670, as shown in FIG. 8.

A straight line, r, from the nearer of $Q_1$ and $Q_2$ to lower edge 550, wherein the straight line is perpendicular to lower edge 550 form an angle α to the longitudinal direction, as shown in FIG. 5. α is termed herein the engagement angle. The engagement angle, α, of a slot is the same in magnitude as angle θ.

In embodiments, base 460 is designed and adapted whereby a straight line r from $Q_1$ intersects lower edge 550 of slot 420 at 90° at the midpoint of the lower edge, wherein line r does not cross a straight line between $M_1$ and $M_2$.

In embodiments, base 460 is designed and adapted whereby a straight line r from $Q_2$ intersects lower edge 550 of slot 420 at 900 at the midpoint of the lower edge, wherein line r does not cross a straight line between $M_1$ and $M_2$.

In embodiments, for a first pair of slots $h_1$ is about 9 inches to about 9.5 inches, about 9.125 inches, or is 9.125 inches; and engagement angle $α_1$ is about 0° to about 30°, about 5° to about 25°, about 10° to about 20°, or about 15°.

In embodiments, for a second pair of slots $h_2$ is 6.75 inches to 6.25 inches, about 6.5 inches, or is 6.5 inches; and engagement angle $α_2$ is about 4° to about 34°, about 9° to about 29°, about 14° to about 24°, or about 22°.

In embodiments, for a third pair of slots $h_3$ is 4 inches to 3.5 inches, about 3.75 inches, or is 3.75 inches; and engagement angle $α_3$ is about 13°, in embodiments about 18° to about 38°, in embodiments about 23° to about 33°, or in embodiments about 28°.

Figure 6:
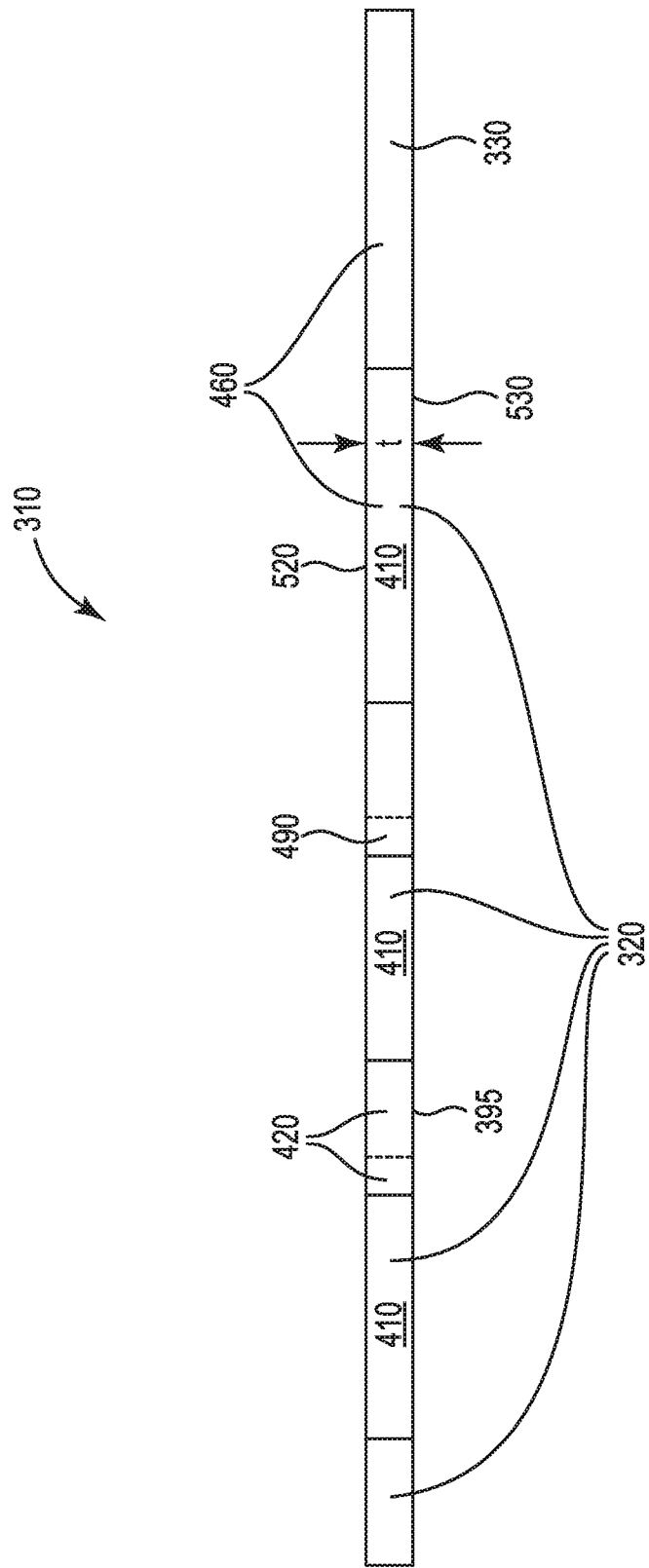
FIG. 6 is a schematic view in a second aspect of the holder shown in FIG. 5.

With reference to FIG. 4, FIG. 5 and further reference to FIG. 6: FIG. 6 is a schematic side view of the holder embodiment depicted in FIG. 4 and FIG. 5. In the embodiments shown in the drawings, for example FIG. 6, base 460 is planar or substantially planar and defines thickness t in the vertical direction. In embodiments, thickness t is about 0.05 inches to about 1 inch, in embodiments about 0.05 inches to about 0.5 inches, in embodiments about 0.1 inches to about 0.5 inches, in embodiments about 0.1 inches to about 0.3 inches, in embodiments about 0.1 inches to about 0.2 inches, in embodiments about 0.13 inches to about 0.18 inches, in embodiments about 0.16 inches, in embodiments about 0.125 inches, or in embodiments 0.125 inches.

In embodiments, thickness t is about 0.125 inches or 0.125 inches and the base comprises, consists of, or consists essentially of polyvinyl chloride (PVC). In embodiments, the PVC is unplasticized PVC (u-PVC).

In embodiments, the holder of the second embodiments further comprises a loop disposed about waist 400. In some such embodiments, the loop is a bungee loop 450. Bungee loop 450 is a loop of elastic material that can be stretched by hand, and is designed and adapted to stretch over legs 500 and provide tension when stretched around waist 400.

With reference to FIG. 5, the loop defines a circumference less than 2W+2t and less than $2S_5+2t$. In the case of an elastic loop such as a bungee loop, the circumference is less than 2W+2t and less than $2S_5+2t$ in its unextended state.

Figure 11A:
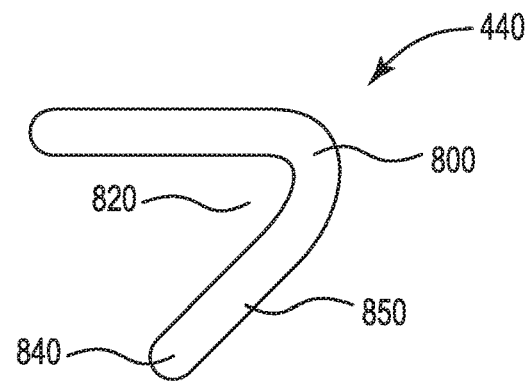
FIGS. 11A and 11B are views in a first aspect and a second aspect respectively of a type of J-hook.
Figure 11B:
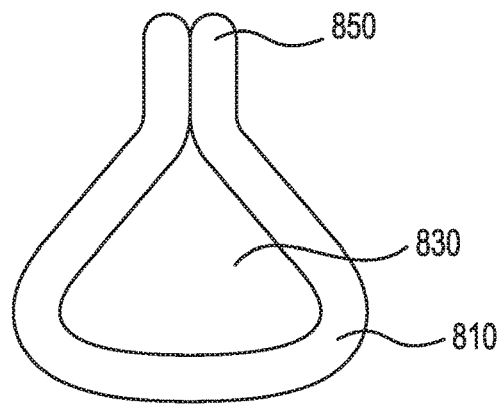
Figure 12:
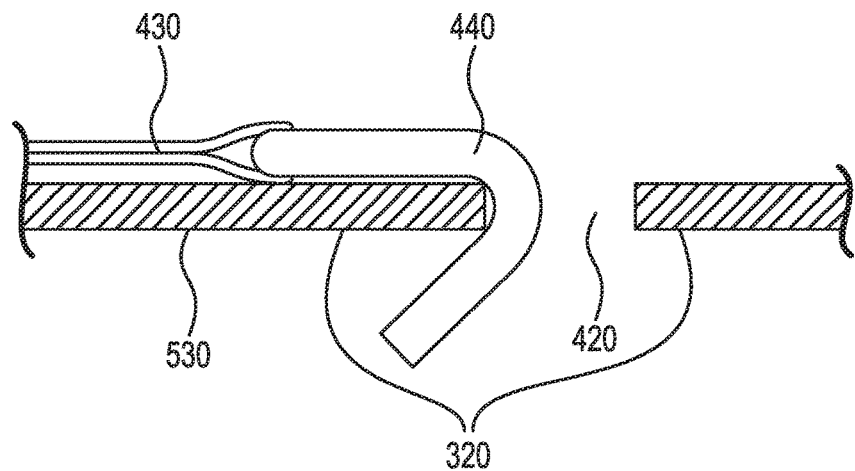
FIG. 12 is a schematic view of a J-hook engaged with a slot of a second embodiment of a holder.

The holder of the second embodiments is particularly well suited to hold J-hook, T-hook, and U-hook terminated straps. J-hooks (or claw hooks) are well-known in the art. One example of an J-hook is shown in FIG. 11A (a lateral aspect) and FIG. 11B (a vertical aspect). As shown in FIG. 11A, J-hooks are not flat. Bend 800 of a J-hook 440 can engage with body portion 320 of base, wherein J-hook 440 passes through slot 420, and bend 800 hooks over lower edge 550 of slot 420 as shown in FIG. 12.

Figure 7:
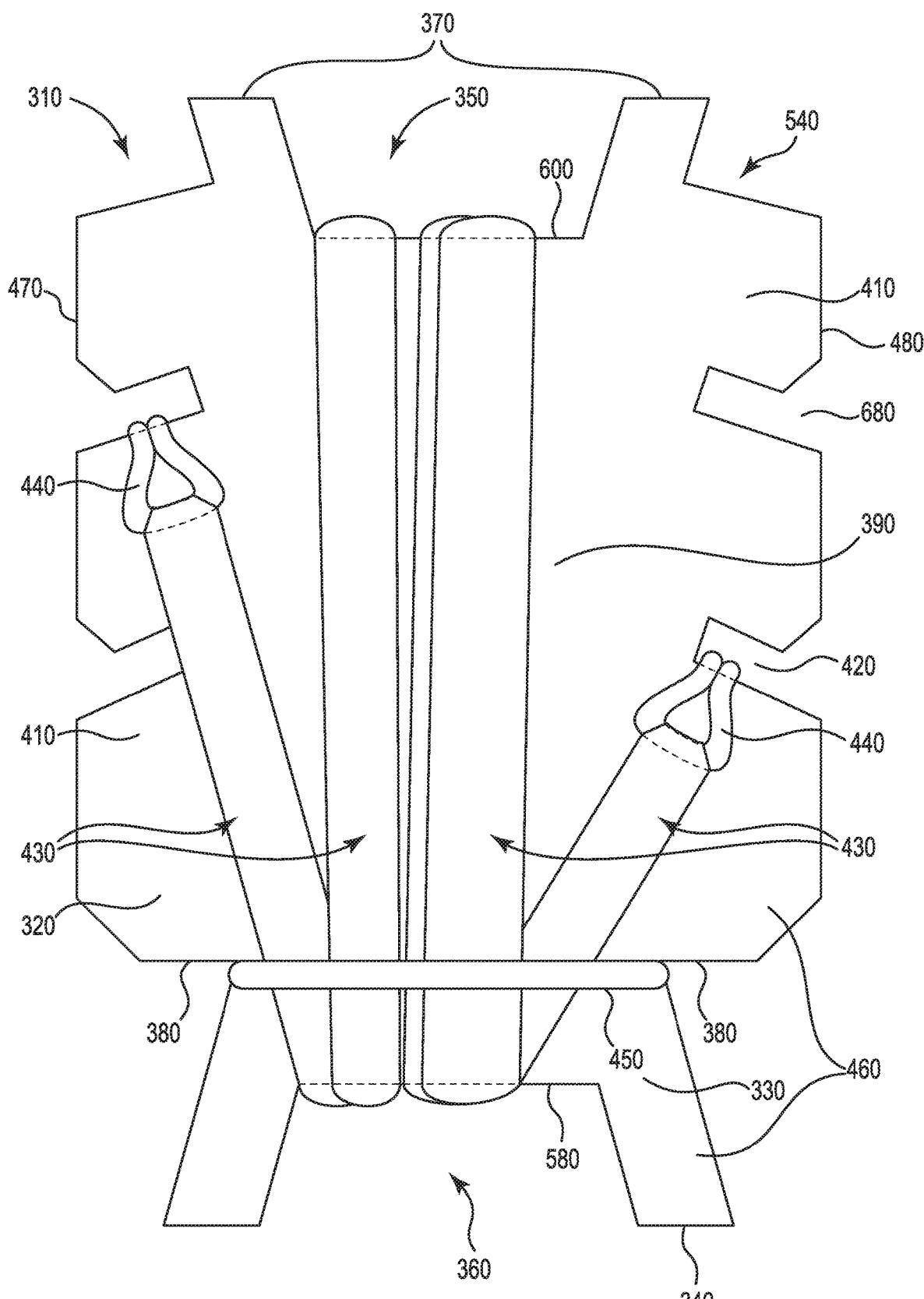
FIG. 7 is a schematic view in a first aspect of a second embodiment of a holder including a bungee loop and with two straps wrapped on the holder.

Referring further to FIG. 7, FIG. 11A, 11B, and FIG. 12: FIG. 7 is a schematic view of the holder of FIG. 5-6 with two J-hook terminated straps wound thereon. Each strap 430 includes a J-hook 440 attached thereto. Each slot 420 is positioned, designed, and adapted to receive and engage with a J-hook. Each J-Hook 440 is engaged with a separate slot 420.

With reference to a single strap: J-Hook 440 is engaged with a slot either by sliding hook 440 into opening 680 of slot 420 from edge 470 or edge 480, or by passing tip 840 of J-hook 440 through slot from top surface 520 to bottom surface 530, whereby claw 850 is on the opposing side of base 460 from webbing of strap 430, as shown in FIG. 12. The J-hook can be engaged with the slot, whereby the tip 840 of the J-hook resides either on bottom surface 530 of the base (as shown in FIG. 12) or the top surface.

The strap 430 is positioned so that it leads from the J-hook to second recess 360, and the strap is tensioned and wound into second recess 360, wrapped around second wrap edge 580, then passed through first recess 350 and around first wrap edge 600, and back into second recess 630, where it is wound around second wrap edge 580. In that fashion, wrapping is continued as long as necessary to wrap the whole strap, thereby providing successive loops of the strap through first wrap area 390, around second wrap edge 580, through second wrap area 395, and around first wrap edge 600 back to first wrap area 390. In embodiments, sufficient tension is applied during winding that large loops around first wrap edge 600 and/or second wrap edge 580 are avoided.

In embodiments, wrapping around the winding track is continued as described until all of the strap is disposed around the holder.

When one or more straps have been wound around holder 10 as described, a loop such as bungee loop 450 is positioned encircling waist 400 and the straps wound onto the holder.

In some embodiments, bungee loop 450 is positioned as follows: A bungee cord is looped around waist 400, stretched, and the two ends fasted and/or tied together. In other embodiments, a bungee cord is already fashioned into bungee loop 450, the bungee loop is stretched over legs 500, and slid until bungee loop 450 encircles waist 400 and all straps passing thereover.

Advantageously and unexpectedly, waist 400 holds bungee loop in place encircling the waist, and bungee loop 450 thus secured around waist 400 prevents straps from unwinding, prevents the straps from sliding over one another, and prevents the straps becoming untensioned, thereby holding the wound straps securely to holder. The loop is securely disposed around the waist and held at the waist because the distance between opposing sides of the holder is at a minimum at the waist and the loop defines a circumference less than the width of the base proximal to the waist. The loop traverses the winding track transversely and encompasses straps wound onto the winding track. Accordingly, the loop retains and secures loops of straps wound onto the winding track and prevents unintended unwinding of the straps.

In embodiments, there is provided a method, the method comprising, consisting of, or consisting essentially of: (i) Providing a holder of the second embodiments and at least one J-hook terminated strap; (ii) engaging the J-hook of the J-hook terminated strap with a slot; (iii) passing the strap under tension over the waist, through the second recess and around the second wrap edge, over the second wrap area, through the first recess and around the first wrap edge, and through the first wrap area; and (iv) positioning a loop around the waist, whereby the loop is under tension and encircles the waist and the strap. In embodiments, the cord is a bungee cord. In embodiments, step (iii) is repeated any number of times from 0 times to 50 times, in embodiments, from 0 times to 40 times, in embodiments from 0 times to 30 times, in embodiments from 0 times to 20 times, in embodiments from 0 times to 10 times, in embodiments from once to 50 times, in embodiments from once to 40 times, in embodiments from once to 30 times, in embodiments from once to 20 times, or in embodiments from once to 10 times.

In some embodiments, the loop is positioned by tying a cord around waist and all windings of the strap, thereby forming the loop and encircling the waist and strap windings passing over the waist. In these embodiments, cord need not be an elastic cord. Indeed, the cord for example could be a plastic lock tie (zip tie), but can be for example In other embodiments, the loop is positioned by stretch an extensible loop of cord such as a bungee loop around the legs and sliding the loop to the waist.

Further second embodiments will now be described with reference to FIG. 8. FIG. 8 shows a further second embodiment of the holder.

In embodiments, for example as shown in FIG. 8, each slot 420 meets either first edge 470 or second edge 480 at 90° or about 90°. Seating notch 510 is defined by base 460, wherein seating notch 510 is a recess in lower edge 550 of the slot. Lower edge 610 of each seating notch has midpoint $M_3$.

Referring to FIGS. 11A and 11B, FIG. 12, and FIG. 8: Bend 800 of a J-hook 440 can engage with body portion 320 of base, wherein J-hook 440 is disposed in slot 420, and bend 800 hooks over lower edge 610 of seating notch 510 whereby claw 850 is on a side of base 460 opposing the side of the base of the top surface 520.

The base is designed and adapted to provide each slot with a seating notch, wherein a J-hook 440 can engage with and sit within the seating notch 510. Advantageously, seating notch 550 provides secure engagement of a J-hook. The J-hook of a strap can be engaged with the portion of the slot that is perpendicular to first edge 470 and second edge 480 and wound onto the holder around the winding track. Thereafter, urging the hook towards the seating notch rotates the strap adjacent to the hook towards the winding track and causes the J-hook to drop into place into the seating notch, with J-hook 440 hooked over lower edge 610 of seating notch 510. Advantageously, this process can be easily carried out by a single person in the dark without assistance.

For every slot, midpoint $M_3$ is closer to midpoint $M_2$ than the portion of lower edge 550 that is perpendicular to edge 470 or 480. Accordingly, a J-hook is held securely while engaged with a seating notch.

In embodiments, the width n of the lower edge 610 of seating notch 510 is 0.5 inches to 1 inch, in embodiments 0.6 inches to 0.7 inches, in embodiments about 0.625 inches (⅝ of an inch), or in embodiments is 0.625 inches (⅝ of an inch).

In embodiments, transverse distance p from midpoint $M_3$ to the nearer of first edge 470 and second edge 480 is 0.5 inches to 1.5 inches, 0.75 inches to 1.25 inches, or about 1 inch.

Second wrap edge 580 defines first end 660 and second end 670. $M_2$ is the midpoint of second wrap edge 580. Quarterpoint $Q_1$ is a point midway between first end 660 and midpoint $M_2$. Quarterpoint $Q_2$ is a point midway between midpoint $M_2$ and second end 670, as shown in FIG. 8.

In embodiments, base 460 is adapted and designed whereby for each slot a straight line r from $Q_1$ intersects lower edge 610 of seating notch at 90° at the midpoint $M_3$ of the lower edge, wherein r does not cross a straight line between $M_1$ and $M_2$. Stated differently, in such embodiments, for each slot $M_3$ is the closest point on lower edge 610 of the seating notch to the closer of quarterpoint $Q_1$ and quarterpoint $Q_2$.

In embodiments, base 460 is designed and adapted whereby a straight line r from $Q_2$ intersects lower edge 610 of seating notch at 90° at the midpoint $M_3$ of the lower edge, wherein r does not cross a straight line between $M_1$ and $M_2$.

Accordingly, there is one line r per slot. Lines r are drawn in on FIG. 8 between $Q_1$ and a first slot (line $r_1$), a second slot (line $r_2$), and a third slot (line $r_3$).

In embodiments, base 460 is designed and adapted to define slots 420 whereby any straight line from the nearer of $Q_1$ and $Q_2$ to lower edge 610, wherein the straight line is perpendicular to lower edge 610, intersects lower edge 610 at its midpoint $M_3$. Unexpectedly and advantageously, this arrangement has the advantage that a J-hooks engaged with any slot is not skewed.

Further Description of First and Second Embodiments

In embodiments, the transverse width of the tail portion of the base tapers from the distal end of the base towards the waist and reaches a minimum at the waist.

In embodiments, the top and bottom surfaces of the base are planar or substantially planar and coplanar or substantially coplanar to each other, whereby the base defines a uniform or substantially uniform thickness, t, between the top and bottom surfaces.

However, in other first and second embodiments the thickness of the base, t, (the distance between the upper surface of the base and the lower surface of the base) is greater proximal to the first edge of the body portion, the second edge of the body portion, the upper end of the body portion, the lower end of the body portion, and/or any other edge of the holder than distal thereto. Stated differently, the base gradually increases thickness approaching an edge thereof. This arrangement has the advantage of conferring rigidity to the base. The average thickness of the base can be decreased, thereby entailing savings in materials constituting the base.

In embodiments, the base of first and/or second embodiments is made from (comprises, consists of, or consists essentially of) polyethylene, polypropylene, polycarbonate, polyvinyl chloride, polycarbonate, polyamide, polyurethane, aluminum, steel, magnesium, zinc, fiberglass composite, wood, plywood, fiberboard, or any combination thereof.

The base may be fabricated by molding, stamping, casting, cutting, 3D printing, or any combination thereof.

As noted herein, in some first embodiments, the pegs may be made as a single piece with the base.

In embodiments, the optional divider(s) of the first and/or second embodiments is/are made as a single piece with the base.

In embodiments, the base comprises, consists of, or consists essentially of a plastic material such as polyethylene, polypropylene, polycarbonate, polyvinyl chloride, polycarbonate, polyamide, polyurethane or any combination thereof.

In embodiments, the base comprises, consists of, or consists of a cellulosic material such as wood, plywood, or fiberboard.

In embodiments wherein the base does not comprise a molded plastic, the pegs may comprise, consist of, or consist essentially of a non-plastic material such as a metal such as steel.

Optional divider is not present in the embodiment of the holder shown in FIG. 6, in embodiments, the base includes one or more dividers; in embodiments one divider, in embodiments two dividers, in embodiments three dividers, in embodiment four dividers. A variety of arrangements of the one or more dividers is possible. In some embodiments wherein the base includes one or more dividers, at least one of the one or more dividers is located on the first wrap area.

In some embodiments, one or more further dividers are located on the bottom surface of the base extending therefrom but outside of the second wrap area. In such embodiments, dividers stiffen and/or strengthen the base.

In embodiments, dividers are linear, e.g. run longitudinally as shown in the drawings. However other shapes and positions are possible.

In some embodiments the first and second wrap edges as described herein are right angled in cross-section; that is the top surface of the base adjoins the first wrap edge, the second wrap edge, or both the first and second wrap edges at 90° or at about 90° (square), and the bottom surface meets the first wrap edge, the second wrap edge, or both the first and second wrap edges at 90° or at about 90° (square). However, in embodiments, the first wrap edge, the second wrap edge, or both the first and second wrap edges are chamfered, radiused, rounded, half-round, or otherwise curved. In embodiments, the first and second wrap edges are not square. In embodiments, the first and second wrap edges are both rounded, that is the top surface of the base transitions to the wrap edge and the wrap edge transitions to the bottom surface without sharp corners or junctions. Avoiding sharp corners or junctions has the advantage that the frictional wear of strap webbing due to movement of the strap webbing relative to the holder is minimized.

EXAMPLES

Example 1—a Holder of the First Embodiments

A holder was made with the design shown in FIG. 1 and FIG. 2 except without divider 260. Referring to FIG. 2, the base was made of three-ply plywood of thickness, t, about 3/19 inches (about 4 mm). Referring to FIG. 1, dimensions were as follows: W was about 8 inches, L was about 12 inches, B was about 9⅛ inches, T was about 2⅞ inches, $A_1$ was about 1 inch, $A_2$ was about 2½ inches, $A_3$ was about 2½ inches, $A_4$ was about 3⅛ inches, $D_1$ was about 1½ inches, $D_2$ was about 1½ inches, ω was about 4⅜ inches, $S_1$ was about 3 inches, $S_2$ was about 3 inches, $S_3$ was about 3⅞ inches, $S_4$ was about 3⅞ inches. The transverse distance from the center of each peg to the nearest of edges 180 and 190 was about one inch. The post of each peg was a screw affixed to the base with a pair of opposing nuts on the top surface and the bottom surface of the base. The cap was a steel washer, fixed onto post with a nut whereby the washer was juxtaposed between the nut and the head of the screw.

A bungee loop was disposed around the waist and the ratchet straps, and the holder comfortably and securely held six ratchet straps terminated with S-hooks, wherein the S-hooks were of various sizes and curvatures. Although the webbing of each strap was relatively flat and slippery and turns of the strap easily slipped laterally over each other, the ratchet straps were held securely by the bungee cord around the waist of the holder, and the ratchet straps were securely held on the holder.

The S-hook of each ratchet strap could be positioned with the tip of the S-hook inside as shown in FIG. 3, but the S-hook of each ratchet strap could be positioned with the tip of the S-hook outside also. Either way, each ratchet strap was held securely.

Example 2—a Holder of the Second Embodiments

A holder of the second embodiments was made with the design shown in FIG. 5 and FIG. 6 (and the same as that of FIG. 5 except without divider 690).

Referring to FIG. 6, the base was made of three-ply plywood of thickness, t, about 3/19 inches (about 4 mm). Referring to FIG. 5, dimensions were as follows: W was about 7⅞ inches, L was about 11⅞ inches, B was about 9⅛ inches, T was about 2¾ inches, $\alpha_1$ was about 15°, $\alpha_2$ was about 19°, as was about 28°, $h_1$ was about 9 inches, $h_2$ was about 6½ inches, $h_3$ was about 3¾ inches, $D_1$ was about 1½ inches, $D_2$ was about 1½ inches, ω was about 4¼ inches, $S_1$ was about 3 inches, $S_2$ was about 3 inches, $S_3$ was about 4 inches, $S_4$ was about 4 inches.

When a bungee cord was disposed around the waist and the ratchet straps, the holder comfortably and securely held six ratchet straps terminated with J-hooks, although the webbing of each strap was flat and slippery, and the turns of the strap slipped over each other easily.

The J-hooks were securely held, irrespective of on which side of the base the tips of the J-hooks were disposed.

Example 3—Varying Slot Angle

Mock-ups of the same holder design as that of Example 2 and shown in FIG. 5 and FIG. 6 were made, except that each of $\theta_1$, $\theta_2$, and $\theta_3$ was varied in increments of 5° from their base values of 15°, 19°, and 28° respectively. J-hook terminated straps were wound onto the mock ups.

If the angle was reduced by 5°, 10°, or 15° (slots become more tilted down towards $M_2$), then the J-hooks engaged securely with the slot, but the J-hooks were skewed with respect to the lower edge of the slot (marked 550 in FIG. 5).

If the angle θ for each slot was increased, the J-hook engaged with the slot became more skewed. At an increase of 5° ($\theta_1$=20°, $\theta_2$=24°, $\theta_3$=33°), the J-hooks remained secure within the slot. At an increase of 10 ($\theta_1$=25°, $\theta_2$=29°, $\theta_3$=38°), the J-hooks were also secure if the holder was held vertically (first wrap edge up). However, at an increase of 15 ($\theta_1$=30°, $\theta_2$=34°, $\theta_3$=43°), the J-hooks slipped from the slots.

Example 4—a Holder of the Second Embodiments

A holder of the second embodiments was made with the design shown in FIG. 8. The design included optional divider marked 690 in FIG. 8.

For each slot, n was about ⅝ inches, δ was about ⅜ inches, x was about ⅜ inches, p was about one inch. $A_1$ was about one inch, $A_2$ and $A_3$ were each about 2½ inches, $\alpha_1$ was about 13°, $\alpha_2$ was about 17°, and as was about 26.5°.

When a bungee cord was disposed around the waist and the ratchet straps, the holder comfortably and securely held six ratchet straps terminated with J-hooks, although the webbing of each strap was flat and slippery, and the turns of the strap slipped over each other easily.

The J-hooks were securely held, irrespective of on which side of the base the tips of the J-hooks were disposed.

I claim:
1. A holder comprising:
a base comprising a body portion, a tail portion, and top and bottom major surfaces defining a thickness therebetween,
the body portion defining opposing upper and lower ends and opposing first and second edges,
the tail portion attached to the lower end of the body portion to form an attachment and extending to a distal end of the base,
the attachment of the tail portion and the lower end of the body portion further defining a waist which is a locally minimum width in the base,
the base defining a first recess in the upper end of the body portion and a second recess in the distal end of base and with an acute trapezoid shape, wherein the top surface includes a first wrap area between the first recess and the second recess and the bottom surface includes a second wrap area between the first recess and the second recess,
wherein the body portion defines a first array of slots open at the first edge and located between the first edge and the first and second wrap areas and having lower slot edges having rising slopes with a minimum angle above zero degrees from a line perpendicular to the first edge as they leave the first edge of the body and a maximum angle below 90 degrees from perpendicular enough to allow a hook end of a strap to effectively be retained in the slot and not slip out, and
wherein the body portion defines a second array of slots open at the second edge and located between the second edge and the first and second wrap areas and having lower slot edges having rising slopes with a minimum angle above zero degrees from a line perpendicular to the second edge as they leave the second edge of the body and a maximum angle below 90 degrees from perpendicular enough to allow a hook end of a strap to effectively be retained in the slot and not slip out.
2. The holder of claim 1, wherein the top and bottom surfaces are substantially coplanar, the upper and lower ends are substantially parallel to each other, and the first and second edges are substantially parallel to each other.

3. The holder of claim 1, the holder further comprising a loop encircling the base proximal the waist, wherein the loop is selected from a bungee loop, a zip tie, an elastic band, or a loop of cord.

4. The holder of claim 1, wherein each of the first array of slots and the second array of slots is an array of three slots.

5. The holder of claim 1, wherein die first recess includes a first wrap edge, the second recess includes a second wrap edge, wherein the first and second wrap edges are substantially linear, and wherein the first wrap edge, the second wrap edge, the upper end of the body portion, and the lower end of the body portion are substantially parallel to each other.

6. The holder of claim 5,
wherein the second wrap edge has a first end and a second end, a midpoint $M_2$ between the first end and the second end, and two quarterpoints $Q_1$ and $Q_2$, wherein is midway between the first end and $M_2$ and $Q_2$ is midway between the second end and $M_2$,
wherein each slot has a lower edge and a recess in the lower edge of the slot, wherein the recess has a lower edge with a midpoint $M_3$, and wherein $M_3$ is the closest point between the slot and the nearer of $Q_1$ and $Q_2$.

7. A method of holding a hook-terminated strap on a holder, the method comprising
(i) providing the holder of claim 1 and at least one hook-terminated strap;
(ii) engaging the hook with one of said slots;
(iii) positioning the strap so that it passes, in order, from the hook over the waist to the second recess;
(iv) positioning the strap so that it further passes, in order, through the second recess, over the waist, through the first recess, and over the waist;
(v) repeating step (iv) any number of times from 0 to 30 times; and
(vi) positioning and tensioning a loop around the waist and at least some windings of the strap.

8. A kit comprising a first component and a separate second component, wherein the first component comprises the holder of claim 1, and the second component comprises a bungee loop.

9. The kit of claim 8, the kit further comprising a hook-terminated strap.

10. The holder of claim 1, wherein the first recess in the upper end of the body portion has an acute trapezoid shape.

* * * * *